(12) United States Patent
Srinivasan et al.

(10) Patent No.: US 11,582,174 B1
(45) Date of Patent: Feb. 14, 2023

(54) MESSAGING CONTENT DATA STORAGE

(71) Applicant: Amazon Technologies, Inc., Seattle, WA (US)

(72) Inventors: Suresh Nagarajan Srinivasan, Tamil Nadu (IN); Lakshminarayanan Vijayaraghavan, Tamil Nadu (IN)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 15/442,465

(22) Filed: Feb. 24, 2017

(51) Int. Cl.
| | |
|---|---|
| H04L 51/10 | (2022.01) |
| G06F 3/04817 | (2022.01) |
| G06F 3/04842 | (2022.01) |
| G06F 3/16 | (2006.01) |
| H04L 51/046 | (2022.01) |
| H04L 67/568 | (2022.01) |

(52) U.S. Cl.
CPC .......... *H04L 51/10* (2013.01); *G06F 3/04817* (2013.01); *G06F 3/04842* (2013.01); *G06F 3/165* (2013.01); *H04L 51/046* (2013.01); *H04L 67/568* (2022.05)

(58) Field of Classification Search
CPC .............................. H04L 51/10; G06F 3/04817
USPC ........................................................ 707/795
See application file for complete search history.

(56) References Cited

U.S. PATENT DOCUMENTS

| | | | |
|---|---|---|---|
| 6,266,642 | B1 | 7/2001 | Franz et al. |
| 7,197,122 | B2 | 3/2007 | Vuori |
| 8,874,429 | B1 | 10/2014 | Crosley |
| 9,053,097 | B2 | 6/2015 | Zivkovic |
| 9,400,788 | B2 | 7/2016 | Davis et al. |
| 2002/0010590 | A1 | 1/2002 | Lee |
| 2002/0046035 | A1 | 4/2002 | Kitahara et al. |
| 2003/0125927 | A1 | 7/2003 | Seme |
| 2005/0261890 | A1 | 11/2005 | Robinson |
| 2006/0224378 | A1 | 10/2006 | Chino et al. |
| 2007/0061152 | A1 | 3/2007 | Doi |
| 2008/0077387 | A1 | 3/2008 | Ariu |

(Continued)

OTHER PUBLICATIONS

MMS Conformance Document, Candidate Version 1.3, May 11, 2011, http://www.openmobilealliance.org/release/MMS/V1_3-20110511-C/OMA-TS-MMS_CONF-V1_3-20110511-C.pdf, p. 46, section 12.3.4 MMS presentation conformance (Year: 2011).*

(Continued)

*Primary Examiner* — Hicham Skhoun
(74) *Attorney, Agent, or Firm* — Lee & Hayes, P.C.

(57) ABSTRACT

Techniques for determining when to store content and when to refrain from storing content are described herein. In some instances, devices exchange communications that include different types of content, such as text, audio data, video data, image data, or the like. For instance, a first device may receive, from a second device, a communication that includes audio data representing speech of a user of the second device, along with text for display on the first device. The text may comprise a transcription of the audio file, additional commentary provided by the user of the second device, or the like. Upon receiving the communication that includes text and audio data, the first device may determine whether or not to store the audio data. For instance, the first device may determine whether it currently stores this audio content. If so, then the first device may refrain from storing the content again.

20 Claims, 14 Drawing Sheets

(56) References Cited

U.S. PATENT DOCUMENTS

| | | | |
|---|---|---|---|
| 2008/0153459 A1* | 6/2008 | Kansal | H04M 1/72547 |
| | | | 455/412.1 |
| 2009/0252305 A1 | 10/2009 | Rohde et al. | |
| 2009/0313007 A1 | 12/2009 | Bajaj et al. | |
| 2010/0121629 A1 | 5/2010 | Cohen | |
| 2010/0185434 A1 | 7/2010 | Burvall et al. | |
| 2011/0252316 A1 | 10/2011 | Pahud et al. | |
| 2012/0110085 A1* | 5/2012 | Malik | G06Q 10/00 |
| | | | 709/205 |
| 2012/0284014 A1 | 11/2012 | Zivkovic | |
| 2013/0238312 A1 | 9/2013 | Waibel | |
| 2014/0075328 A1* | 3/2014 | Hansen | G06Q 10/04 |
| | | | 715/747 |
| 2014/0180668 A1 | 6/2014 | Nasu et al. | |
| 2014/0288919 A1 | 9/2014 | LeBeau et al. | |
| 2014/0303957 A1 | 10/2014 | Lee et al. | |
| 2014/0303958 A1 | 10/2014 | Lee et al. | |
| 2015/0081274 A1 | 3/2015 | Kawamura et al. | |
| 2015/0134322 A1 | 5/2015 | Cuthbert et al. | |
| 2015/0154183 A1 | 6/2015 | Kristjansson et al. | |
| 2015/0287409 A1 | 10/2015 | Jang | |
| 2016/0020917 A1* | 1/2016 | Tuatini | H04L 12/1859 |
| | | | 709/206 |
| 2016/0048503 A1 | 2/2016 | Liang et al. | |
| 2016/0085747 A1 | 3/2016 | Kamatani et al. | |
| 2016/0147740 A1 | 5/2016 | Gao et al. | |
| 2016/0170970 A1 | 6/2016 | Lindblom et al. | |
| 2016/0343272 A1 | 11/2016 | Roche | |
| 2017/0148436 A1 | 5/2017 | Sugiura et al. | |
| 2017/0270103 A1 | 9/2017 | Golan et al. | |

OTHER PUBLICATIONS

Non Final Office Action dated Nov. 16, 2018 for U.S. Appl. No. 15/394,433 "Enhanced Graphical User Interface for Voice Communications" Lemon, 15 pages.

Office Action for U.S. Appl. No. 16/586,457, dated Jan. 13, 2022, Lemon, "Enhanced Graphical User Interface for Voice Communications", 31 pages.

Office Action for U.S. Appl. No. 16/586,457, dated Oct. 8, 2021, Lemon, "Enhanced Graphical User Interface for Voice Communications", 27 pages.

Office Action for U.S. Appl. No. 16/586,457, dated Jun. 8, 2021, Lemon, "Enhanced Graphical User Interface for Voice Communications", 25 pages.

* cited by examiner

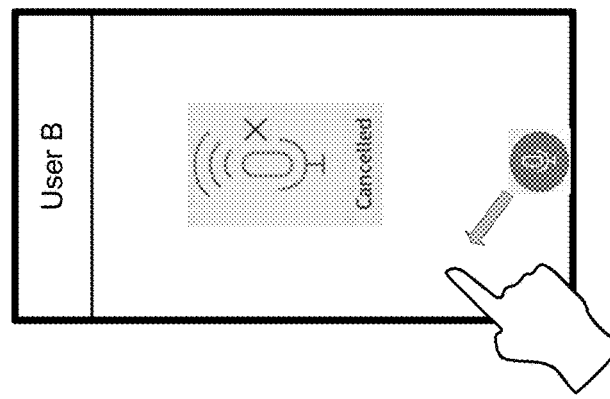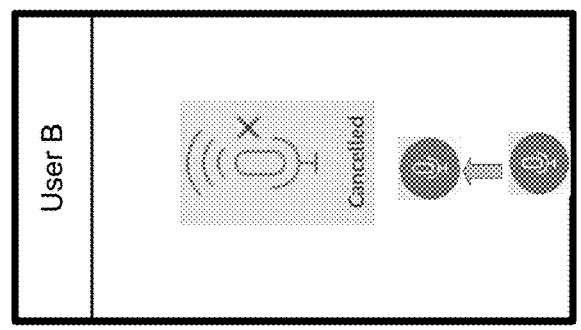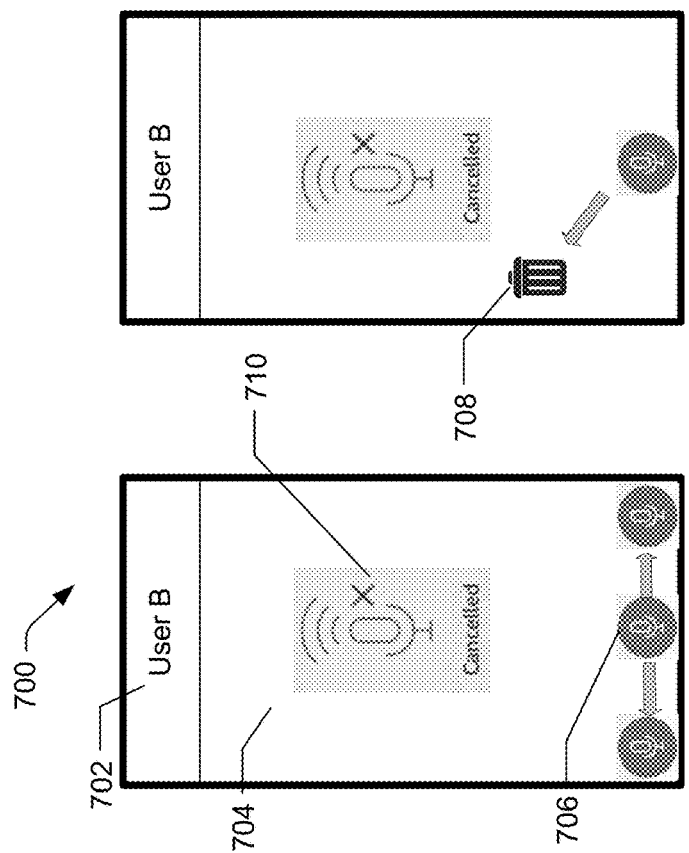

MESSAGING CONTENT DATA STORAGE

BACKGROUND

Text messaging provides a mobile device user the ability to communicate by typing a message and sending that message to other users. The typed message is displayed on the user's device as well as the devices of the other users once received. Alternatively, the user may place a telephone call to another user and leave an audio voice message if the other user does not answer the call. While several communication methods currently exist, users may desire additional methods to communicate with others.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1A illustrates a schematic diagram of an example system for exchanging communications between user devices. In some instances, the communications include voice messages comprising both audio signals and corresponding transcriptions of the audio signals. In other instances, the communications comprise audio signals alone, videos, images, or the like.

FIGS. 7A-D illustrates example user interfaces depicting canceling of an audio recording.

DETAILED DESCRIPTION

Figure 1A:
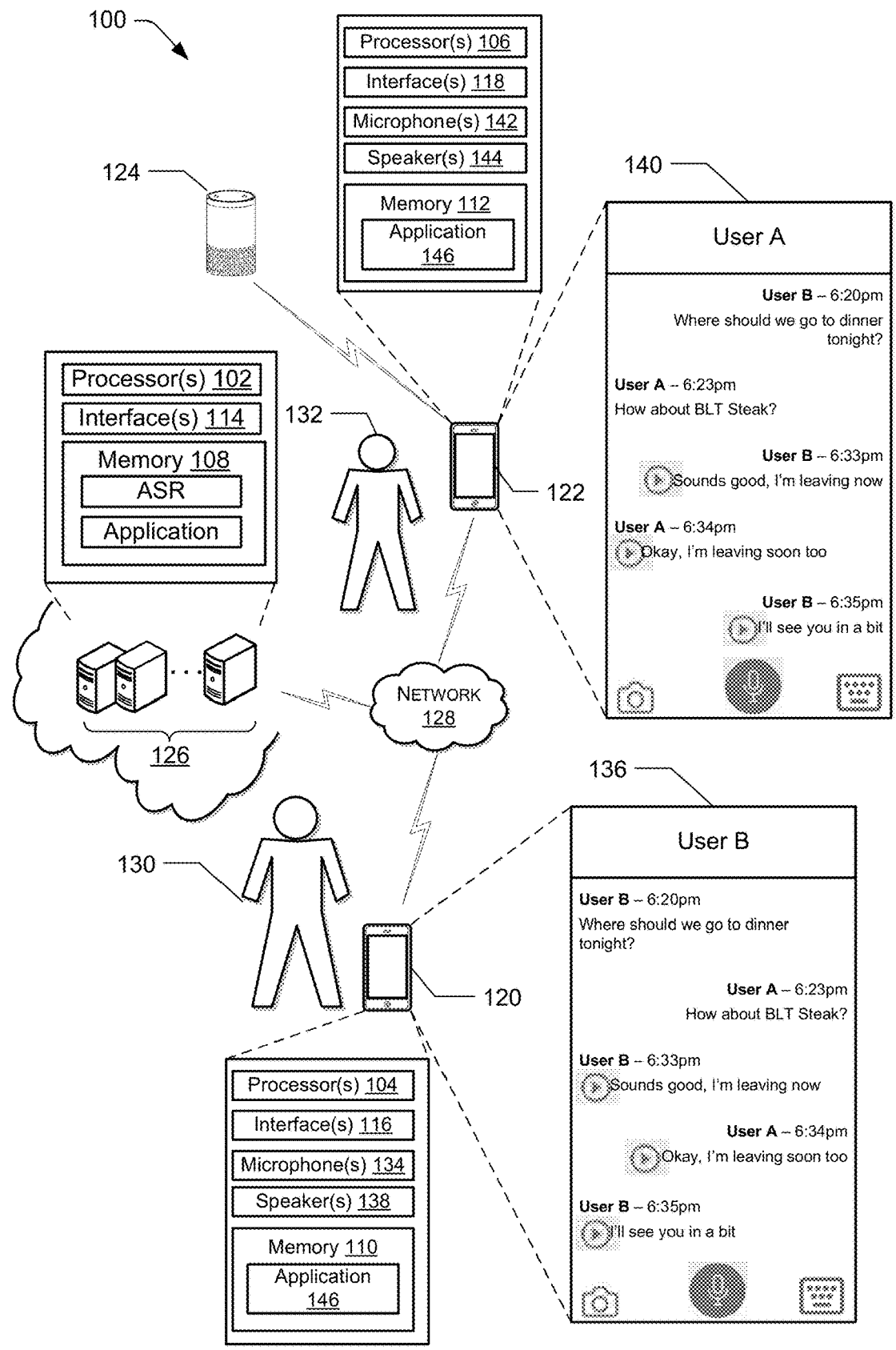

Techniques for determining when to store content and when to refrain from storing content are described herein. In some instances, devices may exchange communications that include different types of content, such as text and audio data, video data, image data, or the like. For instance, a first device may receive, from a second device, a communication that includes audio data representing speech of a user of the second device, along with text that is for display on the first device. The text, meanwhile, may comprise a transcription of the audio file, additional commentary provided by the user of the second device, or the like. Further, in some instances the communication might not include the audio content, but instead may include an identifier (ID) of the audio content.

Upon receiving the example communication that includes the text and either the audio data or the ID of the audio data, the first device may determine whether or not to store the audio data on the device. For instance, the first device may determine whether or not it currently stores this particular audio content. If so, then the first device may refrain from storing the content again. That is, the first device may be programmed to refrain from storing the audio content a second time, thus freeing up memory space for additional pieces of content. If, however, the first device does not currently store the audio content, then the first device may store the audio content such that the first device is able to output the audio content upon receiving a request to do so from the user of the first device. For instance, in instances where the initial communication included the audio-data ID but not the audio data, the first device may download the audio data by requesting, from one or more server computing devices, the audio data corresponding to the audio-data ID.

In some instances, a communication may be associated with a communication ID, while the additional content (e.g., the audio data, video data, etc.) may be associated with a content ID (e.g., the audio-data ID as described above). In these instances, when the first device receives the first communication, the first communication may include the communication ID, the content ID, additional data such as the text, and, potentially, the content itself (such as the audio data). In the example above, for instance, the communication may include the text data, the audio data, the communication ID, and the audio-data ID. In response to receiving the communication, the first device may first determine whether the device currently stores audio data corresponding to the received audio-data ID. For instance, an application executing on the first device may query a table stored in memory of the first device that maps previous communication IDs to corresponding content IDs (e.g., audio-data IDs) that accompanied the respective communications when received. If the table includes the received audio-data ID, then the application may reference another location in memory of the device that maintains the content to determine if this content is still stored on the device. If so, then the device may refrain from storing the content (e.g., audio data) once more. However, the application may store an indication in the table that the received communication ID is associated with the received audio-data ID, thus instructing the application where to look for the corresponding audio data should the user of the first device request to output the audio data while viewing the received communication.

If the audio-data ID is not in the table or if the audio data is in the table but has subsequently been deleted from memory of the device, then the application operating on the device may store the audio data in the memory of the device, in association with the audio-data ID. For instance, if the audio data did not accompany the message, then the device may request to download the audio data by providing the audio-data ID to the one or more server computing devices that received the communication from the sending device (or to another device location at which the audio data is stored). In addition, the application may update the table indicate that the communication ID is associated with the audio-data ID. By making the determination described above, the first device does not duplicate storage of the audio data and needlessly use storage space on the device.

In some instances, the communication application that receives the communication stores the audio data in a first location of memory that is not provided by the communications application. For example, the application may store this data in a file-system cache provided by the operating system of the first device. Further, the application may store the table that maps communication IDs to content IDs in a second memory location of the device, which may be provided by the application (e.g., a cache of the application). In some instances, the first memory location comprises a least-recently-used (LRU) cache that deletes content from the cache based on recency of access, beginning with the least-recently used content. Of course, other algorithms may be utilized to determine the order in which to delete content from the LRU cache. Further, other types of caches may be utilized. In addition, while the example above and the illustrations below depict the described techniques with reference to communications that include audio data, the techniques may apply equally to communications that include video data, image data, files, or the like.

For example, in some instance the techniques may be implemented on voice-controlled devices that are utilized by different users. For instance, a voice-controlled device in a first environment, such as home, may be used by multiple different users, such as different members of the household. In addition, the voice-controlled device may provide a common mailbox that stores messages that are accessible by the multiple users, as well as user-specific mailboxes that store messages that are accessible by individual users when authenticated. That is, an individual mailbox may store messages intended for an individual (as determined by an ID of that individual, the individual's account, or the like). A communal mailbox, meanwhile, may store messages in association with multiple different individual IDs (or individual mailbox IDs, individual account IDs, etc.), or may store messages in association with a communal-mailbox ID that is accessible by multiple different individual credentials. In either instance, while an individual mailbox may be accessible on a device, in some instances, by credentials of an individual, a communal mailbox may be accessible on the same device by credentials of multiple different individuals. In some instances, the device stores received messages locally, while in other instances the device interacts with a remote storage location (e.g., a server) to retrieve these messages.

In some instances, a message that is delivered to both a communal mailbox of the voice-controlled device as well as an individual mailbox of the voice-controlled device may be stored a single time. That is, upon delivery to the communal mailbox, the voice message may be stored in the device, while an association between an ID of the communication received at the communal mailbox and the ID of the audio content. Further, if a communication having the same audio content is received at one or more individual mailboxes, the voice-controlled device may use the ID of the audio content to determine that the audio content is already stored on the device and, hence, the device may refrain from storing it again. However, the voice-controlled device may store an additional indication that the ID of the communication received at the individual mailbox is associated with the ID of the audio content.

In addition to the above, systems and methods for transcription of audio data and display of the same in a message string are described herein. Communication means have expanded with the advent of mobile devices. These communication means include text messaging, telephone calling, and live video streaming in individual applications. The systems and methods described herein provide a user experience where text messaging, telephone calling, and video and/or photograph sharing are provided in a single application. Additionally, the systems and methods described herein provide for recording and transcription of audio to be incorporated into a message string. By so doing, the present systems and methods allow users to quickly and easily choose between multiple communication means in the same conversation.

For example, envision a first user profile associated with User A who desires to communicate with a second user profile associated with User B. User A may operate her device to open a messaging application that allows her to choose to send a text message or a voice message to a device associated with User B's profile. In the latter instances, User A presses an icon or the like and a microphone from User A's device generates audio data that is sent to a remote system, for example, for performing automatic speech recognition thereon. The remote system may then send text data representing the transcription to User A's device and User B's device for presentation in respective messaging windows. In addition, the remote system may send the audio data to User B's device such that User B may choose to listen to the voice message.

The application may include a messaging window that shows both the text messages sent and received back and forth, as well as transcriptions of any voice messages. For instance, User A's device and/or User B's device may present an icon that, when selected, may cause output of audio corresponding to the audio data on a speaker of the device receiving the selection. For example, if User A sent a voice message saying "Congratulations," then the remote system may send text data representing this transcription to both devices while also sending the actual voice message to User B's device. User B's device may present the transcription adjacent to an icon indicating that User A has recorded a voice message for User B's profile. When the icon is selected, User B's device may output, via speakers of the device, the audio associated with the audio data, such as User A stating "Congratulations."

The application and/or the remote system may provide a range of additional, or alternative, functionalities to users. These functionalities may include providing voice calling abilities from the respective messaging windows of the user devices, sending and receiving photographs and videos, canceling audio recordings, copying and deleting text data representing transcriptions, and grouping messages. The application and/or the remote system may also provide a conversations window that summarizes multiple conversations between, for example, User A, and her contacts. The conversations window may provide indications on the types of received messages, the number of unread messages, and features that have been enabled or disabled for various contacts. Text data representing transcriptions of audio data may also be presented in a truncated manner to assist in ease of use while also providing users the ability to expand the transcription as desired.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates an example of a communication transcription system 100 and multiple devices that may utilize system 100. System 100 may include one or more processors. Any processor described herein, such as processor(s) 102, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 104, and/or 106 may possess its own local memory, which also may store program components, program data, and/or one or more operating systems.

System 100 may also include memory 108, 110, and/or 112. Memory 108, memory 110, and memory 112 may include volatile and nonvolatile memory, removable and non-removable media implemented in any method or technology for storage of information, such as computer-readable instructions, data structures, program component, or other data. Such memory 108, 110, and/or 112 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 110, and/or 112 may be implemented as computer-readable storage media ("CRSM"), which may be any available physical media accessible by the processor(s) 102, 104, and/or 106 to execute instructions stored on the memory 108, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 114, network interface(s) 116, and network interface(s) 118 may enable communications between a first device 120, a second device 122, a third device 124, and a remote system 126, as well as other networked devices. Such network interface(s) can include one or more network interface controllers (NICs) or other types of transceiver devices to send and receive communications over a network. The user devices, such as the devices 120 and 122, may comprise mobile devices, voice-controlled assistants (as illustrated), automobiles, appliances (e.g., smart refrigerators, dishwashers, light switches, washing machines, etc.), stereos, televisions, wearable devices (e.g., VR/AR headsets, lapel pins, watches, clothing, jewelry, etc.), or the like. In short, the devices that utilize the techniques described herein may take any type of form factor.

For instance, each of the network interface(s) 114, network interface(s) 116, and network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114, network interface(s) 116, and network interface(s) 118 may include a wide area network (WAN) component to enable communication over a wide area network. The network 128 may represent an array of wired networks, wireless networks, such as WiFi, or combinations thereof.

In some instances, the remote system 126 is configured to receive, from the first device 120 associated with a first user 130, audio data corresponding to user speech. The user speech may include a message directed to a second user 132 associated with a second user profile and/or account and/or the second device 122. The audio data may be generated by at least one microphone 134 associated with the first device 120. The audio data may include data representing the user speech and other sounds, such as, for example, background noise. In some instances, the user speech may be a message directed to the second user 132 and/or the second user profile and/or account of the second device 122.

The remote system 126 may be further configured to analyze the audio data to create a transcription of the user speech. For example, once the audio data is received from the first device 120, the portion of the audio data corresponding to the user speech may be separated from other components of the audio data, such as, for example, background noise. Automatic speech recognition (ASR) techniques may be used to determine words making up the user speech. For example, ASR techniques may include generation of a list that includes the most likely words or phrases spoken by the user, an "N-best list" for example, and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

The remote system 126 may be further configured to send the audio data and text data representing the transcription to a first user interface 136 of the first device 120. The first user interface 136 may be the same or a different user interface that was used to record the audio. Sending the text data representing the transcription to the first user interface 136 may cause the first device 120 to display the transcription, or a portion thereof, on the first user interface 136. The transcription may be displayed as typed text. Sending the audio data to the first user interface 136 may also cause the first device 120 to display an icon corresponding to the audio data on the first user interface 136. The icon, when selected by the first user 130, may cause one or more speakers 138 to output the audio associated with the audio data.

The remote system 126 may be further configured to send the audio data and/or text data representing the transcription to a second user interface 140 of the second device 122. Sending the text data representing the transcription to the second user interface 140 may cause the second device 122 to display the transcription, or a portion thereof, on the second user interface 140. The transcription may be displayed as typed text. Sending the audio data to the second user interface 140 may also cause the second device 122 to display an icon corresponding to the audio data on the second user interface 140. The icon, when selected by the second user 132, may cause one or more speakers 144 to output the audio associated with the audio data. Additionally, or alternatively, the audio associated with the audio data may be output by a device, such as the third device 124, connected, via wired or wireless communication, to the second device 122. The third device 124 may output the audio upon receipt of the audio data by the second device 122, by selection of the icon by the second user 132, by selection of the transcription by the second user 132, and/or by a command provided by the second user 132, such as, for example, an audible command.

In some instances, the remote system 126 may send the audio data and the text data representing the transcription to the second device 122 based at least in part on an indication from the first user 130 that the audio is directed to or intended for the second user 132. The indication may include an instruction from the first device 120 to send the audio data and the text data representing the transcription to the second device 122. The instruction may correspond to the user selecting the name of the second user 132 from a list of contacts and/or selecting a profile and/or account associated with the second user 132. The instruction may also correspond to the first user 130 speaking or otherwise entering a command to send the audio data and/or to start a conversation with second user 132 and/or the second user's profile and/or account.

The remote system 126 may be further configured to receive, from the second device 122, second audio data corresponding to second user speech from the second user 132. The second audio data may be generated by one or more microphones 142 of the second device 122. The second user speech may include a message to be sent to the first user 130. The message may be in response to the first audio data or text data representing the first transcription of the first audio data sent by the first user 130 and/or first user profile and/or account. The remote system 126 may analyze the second audio data to generate text data representing a second transcription of the second user speech. The text data representing the second transcription may be generated in a similar manner to text data representing the transcription of the first audio data described herein. The remote system 126 may send the second audio data and the text data representing the second transcription to the first user interface 136 and to the second user interface 140. Sending the text data representing the second transcription to the first user interface 136 and the second user interface 140 may cause the first device 120 and the second device 122 to display the transcription, or a portion thereof, on the first user interface 136 and the second user interface 140, respectively. Additionally, sending the second audio data to the first user interface 136 and the second user interface 140 may cause the first device 120 and the second device 122 to display icons on the first user interface 136 and the second user interface 140, respectively. The icons may correspond to the second audio data. Selection of the icons by the first user 130 and/or the second user 132 may cause the audio associated with the audio data to be output by the one or more speakers 138 of the first device 120 and/or the one or more speakers 144 of the second device 122.

Additional audio data may be received and sent between the first device 120 and the second device 122. Text data representing transcriptions corresponding to the additional audio data may be generated and sent to the first device 120 and the second device 122.

Additionally, or alternatively, an application 146 executable on the memory 110 on the first device 120 may, when executed by the processor(s) 104, cause the processor(s) 104 to perform operations such as presenting the first user interface 136 on the first device 120. The operations may also include causing the microphone(s) 134 to capture audio corresponding to user speech and generate audio data corresponding to the audio. The operations may further include sending the audio data to one or more processors, such as processor(s) 102 of remote system 126. The operations may also include receiving, from the one or more processors, a transcription of the audio data and displaying the transcription, or a portion thereof, on the first user interface 136 along with an icon corresponding to the audio data. The operations may also include causing the transcription and the audio data to be sent to the second device 122 to be displayed on the second user interface 140. The operations may further include receiving, from one or more processors, such as processor(s) 102, second audio data corresponding to user speech recorded using the second device 122 and a second transcription corresponding to the second audio data. The operations may further include displaying the second transcription, or a portion thereof, and an icon corresponding to the second audio data on the first user interface 136. Audio corresponding to the second audio data may be output by the one or more speakers 138 based at least in part on selection by the first user 130 of the icon corresponding to the second audio data. In addition, the application 146 may determine when to store audio data or other types of data (e.g., video data, image data, etc.) received as part of a communication and when to refrain from storing the content, such as when the application 146 has previously stored the audio content. For example, if the application 146 stores particular audio content in response to receiving a first communication, and if the application 146 executing on the same device receives a second communication that also includes the same particular audio content, then the application may refrain from again storing the audio content, as discussed below.

Figure 1B:
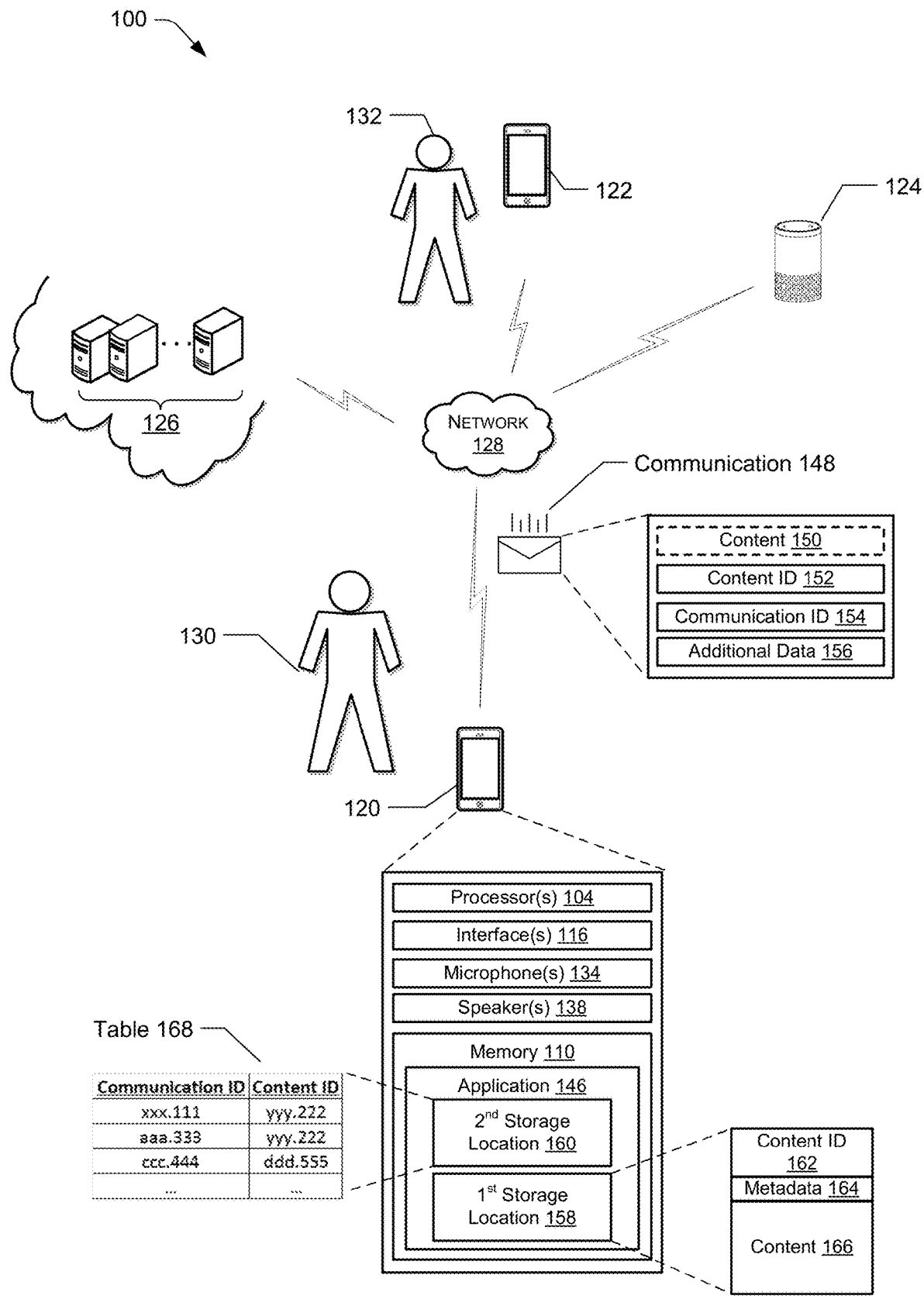
FIG. 1B illustrates a schematic diagram of the example system of FIG. 1A where a first device receives a communication from a second device. The first device determines whether to store content associated with the received communication or, alternatively, whether the first device already stores the content and, thus, need not store the content again.

FIG. 1B illustrates a schematic diagram of the example system of FIG. 1A where the first device 120 receives a communication 148 from the second device 122. The first device 120 determines whether to store content associated with the received communication or, alternatively, whether the first device already stores the content and, thus, need not store the content again. Although FIG. 1B is discussed with reference to the first and second devices 120 and 122 communicating with one another, in some instances the third device 124 may generate the message (comprising the audio file) and send the message over the network 128 to the first device 120 or to another device (e.g., to another voice-controlled device, similar to the third device 124).

As illustrated, the communication 148 may include content 150, a content identifier (ID) 152, a communication ID 154, and additional data 156. The content 150 may comprise audio content (as described above), video content, image content, or the like. As described above, and as illustrated by the dashed line in FIG. 1B, in some instances the communication 148 may include the content 150, while in other instances the communication might not. In the latter instances, the receiving device may determine, using the content ID 152, whether or not to request to download the content 150 from the remote system 126 (or another remote location), as described in further detail below.

The content ID 152, meanwhile, may uniquely identify the content 150. In some instances, the second device 122 generates the content ID in response to generating the content 150, while in other instances the remote system 126 may assign this ID 152 to the content 150 (e.g., in response to receiving the audio signal from the device). Similarly, the communication ID 154 may uniquely identify the communication 148 and may be generated by the device 122 or the remote system 126 in some instances. The additional data 156, meanwhile, may represent text (e.g., a transcription of the content 150), commentary by the user 132, or other data.

The communications application 146 of the first device 120 may receive the communication 148. Upon receiving the communication 148, the application 146 may first determine whether the communication 148 is of a particular type of communication that may include additional content to potentially download and store. For instance, the application 146 may determine whether the communication 148 includes content 150, such as audio data, video data, or the like. If so, then the application 146 may determine whether or not to store the content 150 based on whether or not the first device 120 already stores this content.

As illustrated, memory 110 outside of the application 146 may provide a first storage location 158 at which the content is stored, while a second storage location 160 provided by the application may provide a table 168 is maintained for mapping associations between communications and respective content. While this example describes two different storage locations, in other instances a single storage location or other combination of storage locations may be utilized. In this example, the first storage location 158 stores respective content 166 along with respective content IDs 162 and metadata 164 associated with that content. For example, the first storage location 158 may store previously received audio files, video files, or the like. Further, the first storage location 158 may store the respective IDs for use in determining whether or not to store subsequently received content. In this example, upon receiving the communication 148, the application 146 may analyze the first storage location 158 to determine whether the particular content ID 152 is represented in the first storage location 158. If not, then the application may store the content 150 in the first storage location 158 in association with the content ID 152. Additionally or alternatively, the application 146 may analyze the table 168 in the second storage location 160 to determine whether the content is references in the table, thus indicating that is stored in the first storage location 158. If so, then the application 146 may refrain from again storing the content in the first storage location 158.

If, however, the content ID 152 is represented in the first storage location 158, then the application 146 may determine to refrain from again storing the content 150 in the first storage location 158. If the content 150 was not received as part of the communication then the application 146 may determine to refrain from requesting to acquire the content 150. If, however, the content 150 was received as part of the communication, then the application 146 may determine to refrain from persistently storing the content. In addition, the application 146 may delete the copy of the content 150 received as part of the communication. Regardless of whether or not the application 146 stores the content 150, however, the application 146 may update the table 168 to indicate that the newly received communication 148 is associated with the content 150. That is, the application 146 may store an indication in the table 168 that the communication ID 154 is associated with the content ID 152. Therefore, when the application 146 requests to output the content 150 when presenting the communication 148, the application 146 is able to determine where in the first storage location 158 to retrieve the content 150 from.

In some instances, the first storage location 158 comprises a file-system cache provided by an operating system of the device 120. For instance, the first storage location 158 may comprise a least-recently-used (LRU) cache that deletes content based on recency of access. Therefore, in some instances when a user requests to access content of the content 166 from the first storage location 158, the application 146 may update the respective metadata 164 of that respective content to indicate that time of last access. These access times may later be compared to one another for determining which content to delete if the first storage location 158 becomes full and space is required. Of course, while this example describes an LRU cache, it is to be appreciated that other implementations may utilize a first-in-first-out (FIFO) cache, a most-recently-used (MRU) cache, a least-frequently-used (LFU) cache, or the like. Further, in some instances, when content is removed from the first storage location 158, the table 168 may be updated to remove the notation of the corresponding content ID. Therefore, the application may reliably depend on determining whether the device stores a particular piece of content by analyzing the table 168 rather than needing to check the first storage location 158 in addition to the table 168.

Figure 2A:
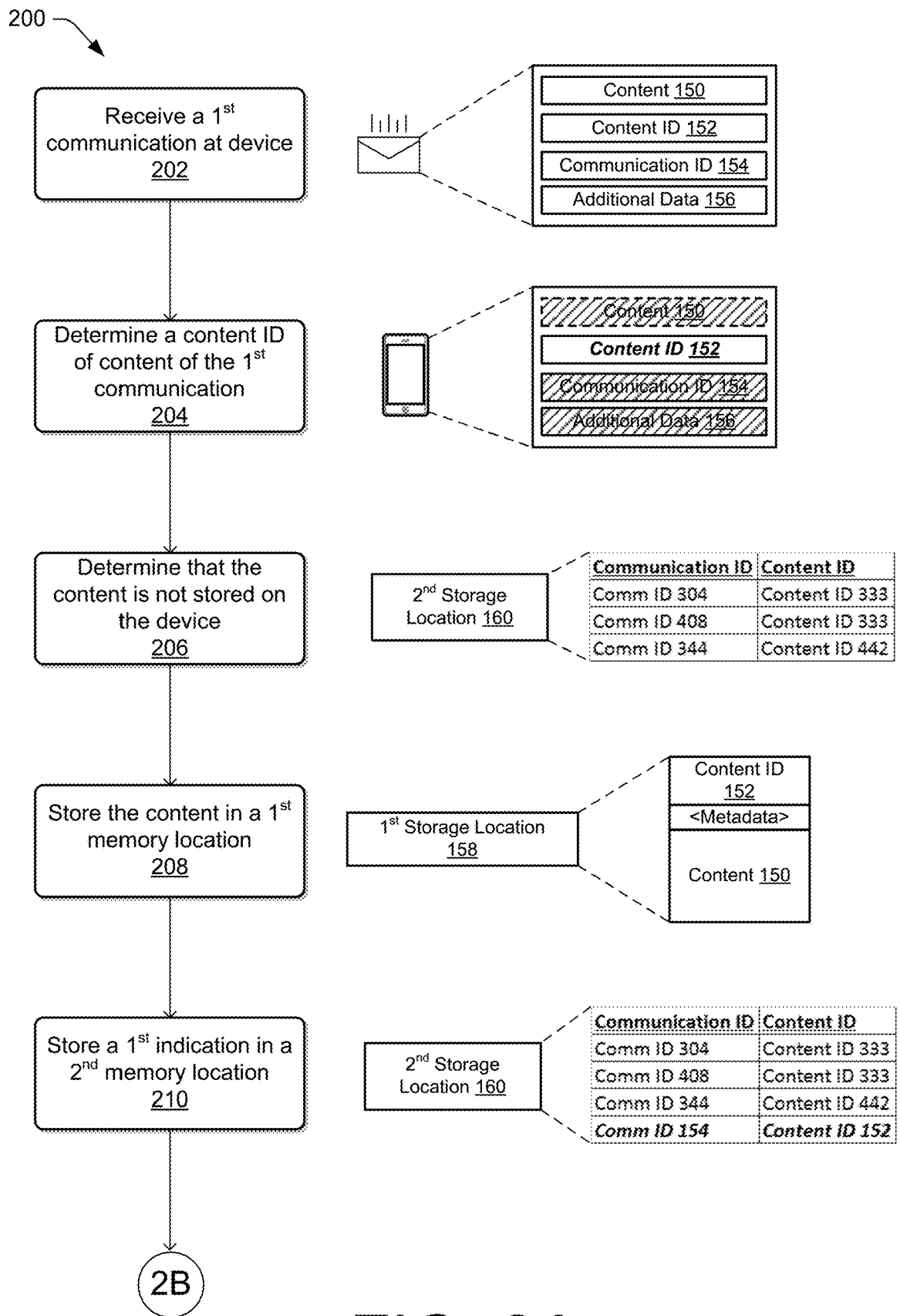
FIGS. 2A-B collectively illustrate a flow diagram of an example process for receiving a first communication, storing content of the first communication, receiving a second communication, determining that the second communication includes the same content as the first communication, and refraining from again storing the content.
Figure 2B:
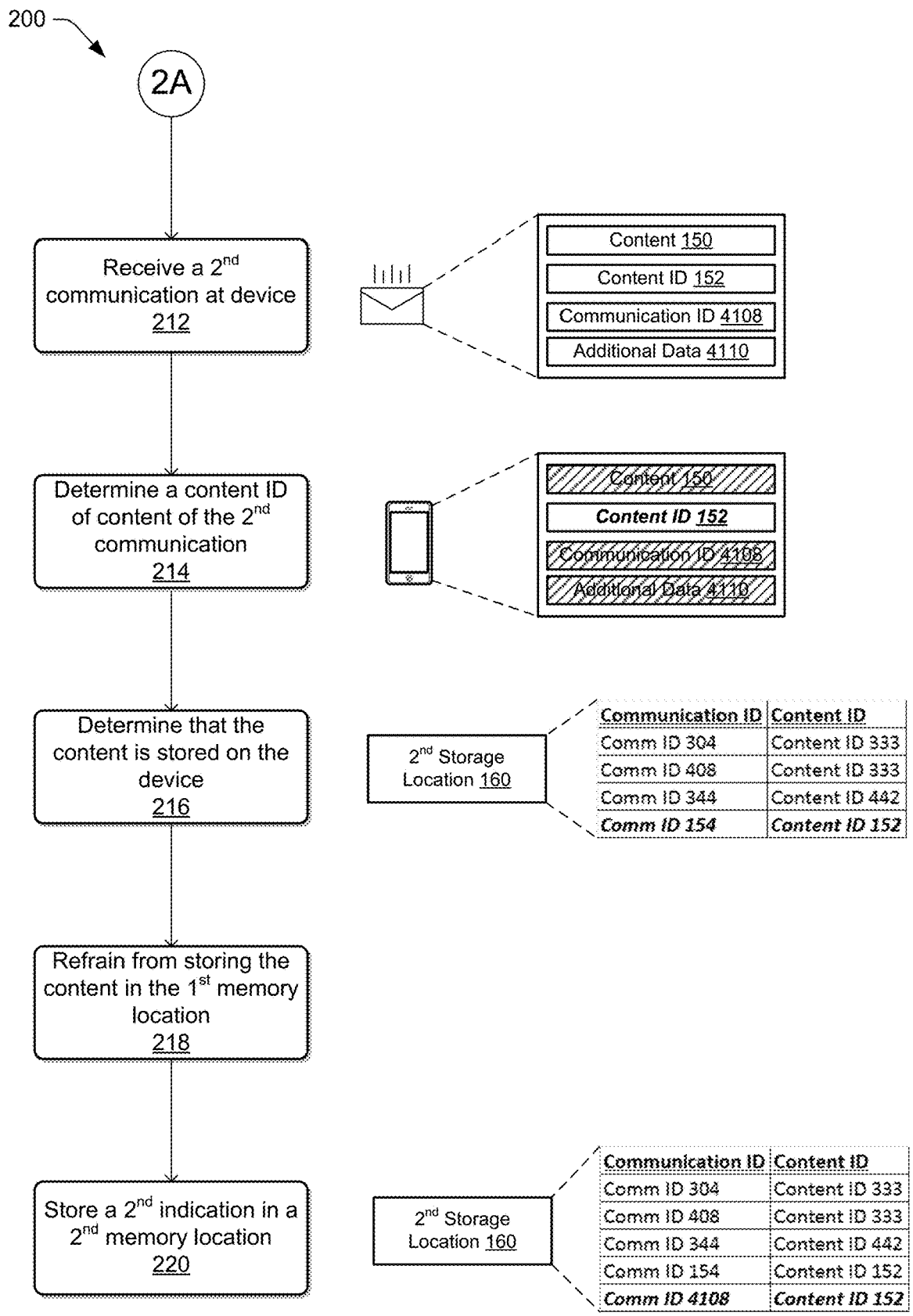

FIGS. 2A-B collectively illustrate a flow diagram of an example process 200 for receiving a first communication, storing content of the first communication, receiving a second communication, determining that the second communication includes the same content as the first communication, and refraining from again storing the content. The process 200 is illustrated as a logical flow graph. The order in which the operations or steps are described herein is not intended to be construed as a limitation, and any number of the described operations may be combined in any order and/or in parallel to implement process 200. In some instances, the application 146 may perform some or all of the described operations.

At block 202, the process 200 receives a first communication at the device. As illustrated, the communication may include the content ID 152, the communication ID 154, and the additional data 154 discussed above. In some instances, the communication may include the content corresponding to the content ID 152, while in other instances it may not. The content 150 may comprise audio data, video data, image data, or the like. The additional data 154 may comprise text data, such as a transcription of the audio or video data, or potentially other text, such as free-form commentary provided by a user that sent the communication. Furthermore, it is to be appreciated that the first communication (and other communications described herein) may be received in one or more logical steps. For instance, the communication illustrated in FIG. 1B may be received in a single package or in two or more discrete packages.

At 204, the process 200 determines the content ID 152 of the content 150 that formed a part of the received communication. For instance, the application 146 may analyze a header, metadata, or other portion of the received communication to identify the content ID. In this example, the process 200 identifies the content identifier as "Content ID 152." In some instances, the application 146 determines the content ID 152 in response to receiving the communication. In other instances, a different trigger causes the application to determine the content ID 152 for the purpose of determining whether or not to request to acquire the corresponding content. For instance, when a user of the device selects to view a conversation (i.e., message thread) between the first and second device, the application 146 may determine the content ID 152. Of course, other trigger events may be used to cause the application 146 to make this determination.

At 206, the process 200 determines that the content 150 corresponding to "Content ID 152" is not currently stored on the device. For example, the application 146 may analyze the second storage location 160 by reading data of the second storage location 160 to determine whether the table 168 includes a row of data that includes the "Content ID 152." In this example, the application 146 determines that the table 168 does not include this content identifier and, thus, the application 146 determines that the content 150 corresponding to this content identifier is to be stored at the device. That is, the application 146 may determine that each content identifier represented in the table 168 is different that the content identifier of the content 150. While the above example describes the application 146 analyzing the second storage location 160 to make this determination, in other instances the application 146 may additional or alternatively analyze the first storage location 158 to determine whether the first storage location includes a key having a value of "Content ID 152."

At 208, in response to determining that the device does not store the content 150, the process 200 stores the content in the first memory location. This may include sending a request to the remote system 126 for the content 150 associated with the content ID 152. For instance, the application 146 may receive the content 150 from the remote system 126 and store the content 150 in association with the content ID 152 in the first storage location 158, which may comprise a file-system cache provided outside of the application 146. For example, the first storage location 158 may comprise an LRU cache, a FIFO cache, or any other type of memory location. Further, rather than deleting content in the first memory location according to a preexisting cache algorithm such as LRU or FIFO, the application 146 may utilize a custom algorithm for scoring respective pieces of content for determining which content to delete if storage space is needed. For instance, the application 146 may utilize an algorithm that calculates respective scores based on an identity of the sender of the content, a size of the content, a frequency at which the content has been received (e.g., by determining a number of communication IDs associated with the respective piece of content in the table 168), a time of day at which the content was received, or the like. In some instances, the application 146 may assign different weights to these values to generate a score for the piece of content. When storage space is needed, therefore, the content with the lowest score may be removed from the first storage location 158 to make room for the new (higher-scoring) piece of content.

The block 208 also illustrates that the application may maintain certain metadata associated with the content 150 stored in the first memory location. This metadata may include the information mentioned (e.g., identity of sender, time of day received, etc.), as well as a time of last access of the respective content 150. In instances where the first storage location 158 comprises an LRU cache (or other types of cache that utilize time of last access for determining when to delete content), the time of last access may be utilized for determining when to delete content from the cache, with content being accessed farthest back in time being deleted first and so forth. In instances where the first storage location 158 comprises a FIFO cache, meanwhile, upon receiving a communication, the application may analyze the content ID to determine whether the corresponding content is currently stored and, if not, may deleted that oldest piece of content in the cache to make room for the most recently received content.

In addition to storing the content 150 in the first storage location at 208, at 210 the process may store a first indication of that the communication is associated with the content 150 in the second memory location 160. For example, the application 146 may store, in the table 168, an indication that the communication ID 154 of the communication is associated with the content ID 152 of the content 150. Thus, both the communication ID 154 and the content ID 154 may be used as keys for accessing the table 168. As used herein, a memory location or storage location may comprise, is some but not all instances, any set of sandboxed bits/bytes of memory or other bits/bytes of memory that are dedicated to a portion of the memory component of the device on which the memory component resides. As such, a first memory or storage location may correspond to a first address of bits/bytes while a second memory or storage location may correspond to a second, different address of bits/bytes.

FIG. 2B continues the illustration of the process 200. At 212, the process 200 receives a second communication at the device. As illustrated, the second communication may the content ID 152, a new communication ID 4108 (given that it is a different communication), and additional data 4110, potentially along with content 150. The additional data 4110 may comprise text data, such as a transcription of the audio or video data, or potentially other text, such as free-form commentary provided by a user that sent the communication.

At 214, the process 200 determines the content ID 152 of the content 150 that formed a part of the received second communication. Again, this action may be triggered in response to receiving the second communication, in response to receiving a request to open a message thread associated with the second communication, or the like. To determine the content ID 152, the application 146 may analyze a header, metadata, or other portion of the second communication to identify the content ID. In this example, the process 200 identifies the content identifier as "Content ID 152." At 216, the process 200 determines that the content 150 corresponding to "Content ID 152" is already stored on the device. For instance, the application 146 may analyze the table 168 maintained in the second storage location 160 to determine the existence of "Content ID 152" (associated with a previously received communication associated with "Communication ID 154"). In addition or in the alternative, the application 146 may analyze the first storage location 158 to determine existence of content associated with a key of "Content ID 152".

In either instance, given that the device currently stores the content 150 corresponding to "Content ID 152", at 218 the process 200 may refrain from storing the content 150 of the second communication in the first storage location 158. For instance, the process 200 may refrain from requesting the content from the remote system 126. However, at 220, the process 200 may update the table 168 to reflect that the second communication is associated with the content 150 corresponding to "Content ID 152". For instance, and as illustrated, the application 146 may update the table 168 to indicate that "Communication ID 4108" is associated with "Content ID 152". As illustrated, the table 168 now indicates that both the first and second communications (having IDs of 154 and 4108, respectively) are associated with the content 150 associated with "Content ID 152". As such, when a user requests to output the content on the device from the first communication, the application may output the content 150 stored (only once) in the first memory location 158. Similarly, when the user requests to output the content on the device from the second communication, the application 146 may output the same instance of the content 150 stored in the first memory location 158. For instance, if the content 150 comprises audio content, then a speaker of the device may output the audio content, and if the content comprises video content or image content (e.g., still image content), then a display of the device may output the content.

Figure 3:
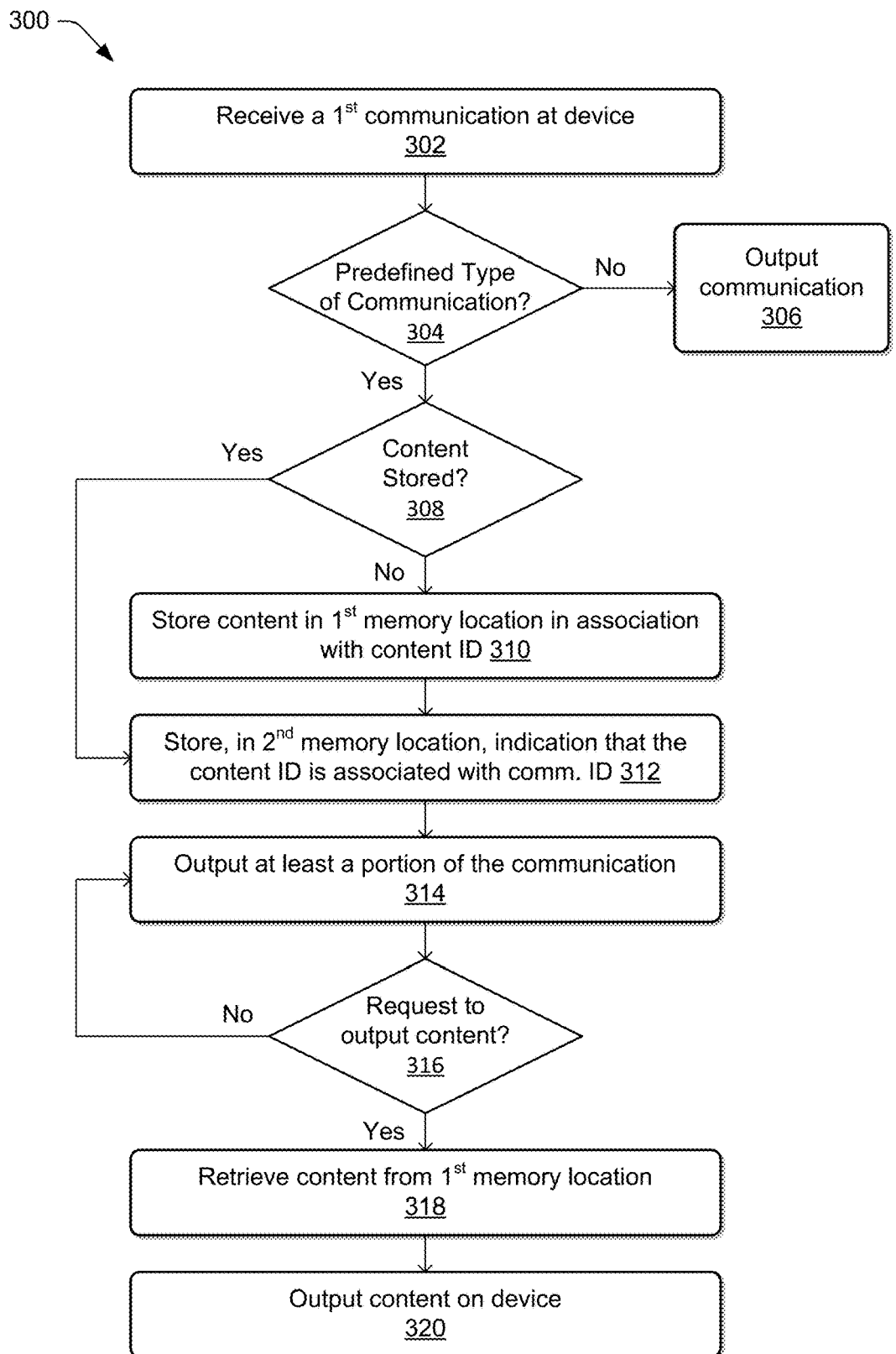
FIG. 3 illustrates a flow diagram of an example process for determining when to store content associated with a communication and when to refrain from doing so.

FIG. 3 illustrates an example process 300 for determining when to store content associated with a communication and when to refrain from doing so. The process 300 is illustrated as a logical flow graph. The order in which the operations or steps are described herein is not intended to be construed as a limitation, and any number of the described operations may be combined in any order and/or in parallel to implement process 300. In some instances, the application 146 may perform some or all of the described operations.

At 302, a first communication may be received at a device. In response, at 304 the application 146 may determine whether the communication is of a predetermined type. For instance, the application may determine whether the communication includes an attachment having a particular file type, such as whether the communication includes attached audio data, video data, image data, or the like. If not, then then the application may simply out the communication at 306. For instance, if the application 146 determines that the communication is a simple text message (SMS) message without attached content, then the application 146 may simply output the text message on a display of the device.

If, however, the application determines that the communication is of a predefined type, then at 308 the application 146 determines whether the content associated with the communication is already stored. As described above, different triggers may be utilized for causing the application to make this determination. For instance, and as described above, this action may be triggered by receiving the communication, opening the message thread corresponding to the communication, or the like. Also as described above, the application 146 may reference a content ID associated with content received as part of the communication to determine whether the content ID is references in LRU cache or other storage location. If not, then then the application 146 may store the content in the first memory location, such as the LRU cache, at 310. In either instance, however, the application 146 may store, at 312 and in a second memory location, an indication that the content ID associated with the received content is associated with the communication ID of the received communication. For instance, the application 146 may update the table 168 discussed above with reference to FIG. 1B.

At 314, the application 146 may output at least a portion of the communication. For example, the communications application may output the text of the communication, potentially along with an icon that, when selected, causes the application to output the content (e.g., audio content, video content, etc.). For example, the icon may comprise a "play" icon that causes the device to play the content. At 316, the application queries whether a request to output the content has been received, such as via selection of the icon. If not, then the application simply continues to output the portion of the communication. If such a request is received, however, then at 318 the application retrieves the content from the first memory location and, at 320, outputs the content on the device. For example, the application may reference the second storage location using the communication ID as a key to identify the content ID. The application may then use this identified content ID as a key for locating the actual content in the first storage location. The device may then output the content using a speaker, a display, or any other appropriate output device based on the type of content of the communication.

Figure 4:
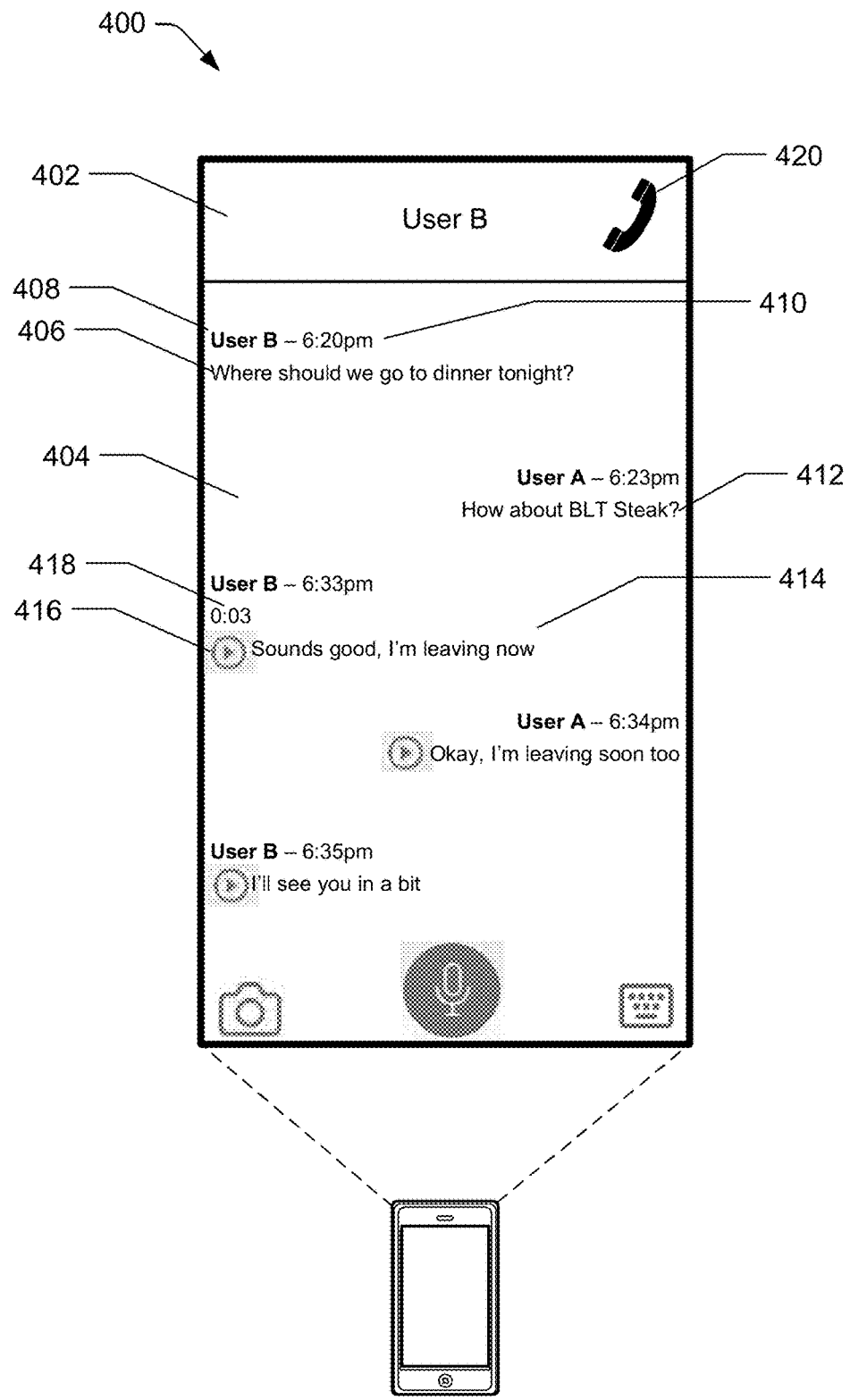
FIG. 4 illustrates an example user interface for sending and receiving audio messages, transcriptions, and text messages.

FIG. 4 illustrates an example user interface 400 for sending and receiving audio messages, transcriptions, and text messages, among other communication types. The user interface 400 may be similar to the user interface 136 and/or 140 shown in FIG. 1 and may include similar functionality. The user interface 400 may be configured as a single application that provides for display of audio messages, transcriptions, text messages, and other communication types without requiring a user or a device to open and/or use multiple applications. The user interface 400 may include a header window 402 that may include the name or other identifying information of a user, and/or a user's profile or account, that will receive and send messages with the user of the device on which the user interface 400 is displayed. In the example of FIG. 4, the user that will receive and send messages is "User B." As used herein, the user of the depicted user interface will be described as the first user, and the recipient or other user will be described as the second user. However, it should be appreciated that the first user and second user may both send and receive messages as described herein. Additionally, when messages are described as being sent to and/or from a user, it should be appreciated that the messages may be sent to one or more user profiles associated with a user and/or one or more user accounts associated with a user. A user may be associated with more than one account, and each account may be associated with multiple profiles. The user profiles and/or user accounts may be associated with devices of the user, such as, for example, phones, computers, tablets, personal assistants, or any of the devices described above.

The user interface 400 may also include a messaging window 404. The messaging window 404 may include messages sent between the first user and the second user. Additionally, multiple other users may be involved in any given conversation. In these examples, the messaging window 404 may include messages sent and received from each of the multiple users. The messaging window 404 may include a text message 406, for example, sent by the second user as well as a name 408 associated with the text message 406. The name 408 may be a shortened or abbreviated version of the name displayed in the header window 402. The name 408 may be displayed in proximity to the text message 406 such that the first user, when viewing the user interface 400, may perceive the text message 406 as being associated with the name 408. A time of day 410 that the text message 406 was received, generated, and/or sent may also be displayed near the text message 406. For example, the text message 406 as shown in FIG. 4 reads "Where should we go to dinner tonight?" The name 408 associated with that text message 406 is "User B" and the text message 406 was received at 6:20 pm. The text message 406, the name 408, and the time of day 410 are displayed in close proximity to each other such that the first user may determine that the text message 406, the name 408, and the time of day 410 are associated with each other.

The messaging window 404 may also include messages sent by the first user to the second user. For example, text message 412 was sent by the first user, here "User A." A name associated with the first user and a time of day that the text message 412 was sent may also be displayed similar to the name 408 and time 410 for text message 406. Messages sent to the device associated with the first user may be displayed differently from messages sent from the device associated with the first user. For example, as shown in FIG. 4, the messages sent to the device, the messages sent from "User B" for example, may be displayed on one side of the user interface 400, whereas the messages sent from the device, the messages sent from "User A" for example, may be displayed on an opposing side of the user interface 400. Additional differences between sent messages and received messages may also be displayed, such as changes in text font, text size, italics, bolding, underlining, highlighting, and/or coloring.

The messaging window 404 may also include transcriptions and icons corresponding to audio data. For example, as shown in FIG. 4, a transcription 414 is displayed next to an icon 416, which corresponds to audio data receive from, for example, a device associated with "User B." The audio data may correspond to audio received from the second user's device and/or directed to the first user. When the first user selects the icon 416, one or more speakers of the first device may output audio associated with the audio data. In this example, the one or more speakers may output audio that includes the words "Sounds good, I'm leaving now." The audio may be a copy of the audio received from the second user, and in this example, the voice heard in the audio may be the second user's voice. Alternatively, the audio may be a rendering of the audio received from the second user, and in this example, the voice heard in the audio may be a computerized voice or one or more voices preprogrammed to output audio. The first user may also, or alternatively, select the transcription 314, and based at least in part on the selection, the one or more speakers of the first device may output audio associated with the transcription. As with selection of the icon 316, the voice heard in the audio may be the second user's voice, a computerized voice, or one or more voices preprogrammed to output audio.

The messaging window 404 may also include a duration indicator 418. The duration indicator 418 may provide a visual indication of the length of the audio recording. For example, as shown in FIG. 4, the duration indicator 418 shows a minute and second symbol, for example, "0:03," which indicates to the user that the duration of the audio recording is 3 seconds. Various symbols and/or formats may be used to depict the duration indicator 418. For example, the duration indicator 418 may provide the duration in seconds, in minutes, or portions of minutes. In addition to, or alternatively from, the icon 416, the duration indicator 418 may provide a visual indication to the user that the corresponding text shown in the messaging window 404 is a transcription of audio data, as opposed to a text message.

The various text messages, icons, and transcriptions may be displayed in the messaging window 404 in chronological order such that the messages sent and/or received first in time appear at or near the top, such as near the header window 402, of the messaging window 404, while messages sent and/or received at later times appear in chronological order under those messages sent and/or received first in time. As additional messages are sent and/or received, they may be displayed in chronological order at or near the bottom of the messaging window 404. Alternatively, the messages sent and/or received first in time may appear at or near the bottom of the conversation 404, while messages sent and/or received at later times may appear in chronological order above those messages sent and/or received first in time. When the messages fill or substantially fill the messaging window 404, older messages may be pushed out of view in the messaging window 404. The first user may view the older messages that have been pushed out of view by scrolling in the messaging window 404. The scrolling may be by touch input such as when the first device includes a touchscreen, clicking on a scroll bar, scrolling by a mouse or other pointing device, and/or by providing a scrolling command to the first device such as an audible command.

The user interface 400 may also include a call icon 420. The call icon 420, when selected by the first user, may enable a voice call with the second user. Selection of the call icon 420 may automatically place a voice call to the second user. Alternatively, selection of the call icon 420 may prompt the user to confirm that a voice call should be placed. Additionally, if more than one telephone number is associated with the second user, the user may be prompted to select the telephone number that the user wishes to place a call to. Additionally, or alternatively, the user may be prompted with an option for the voice call to be a video call.

Figure 5:
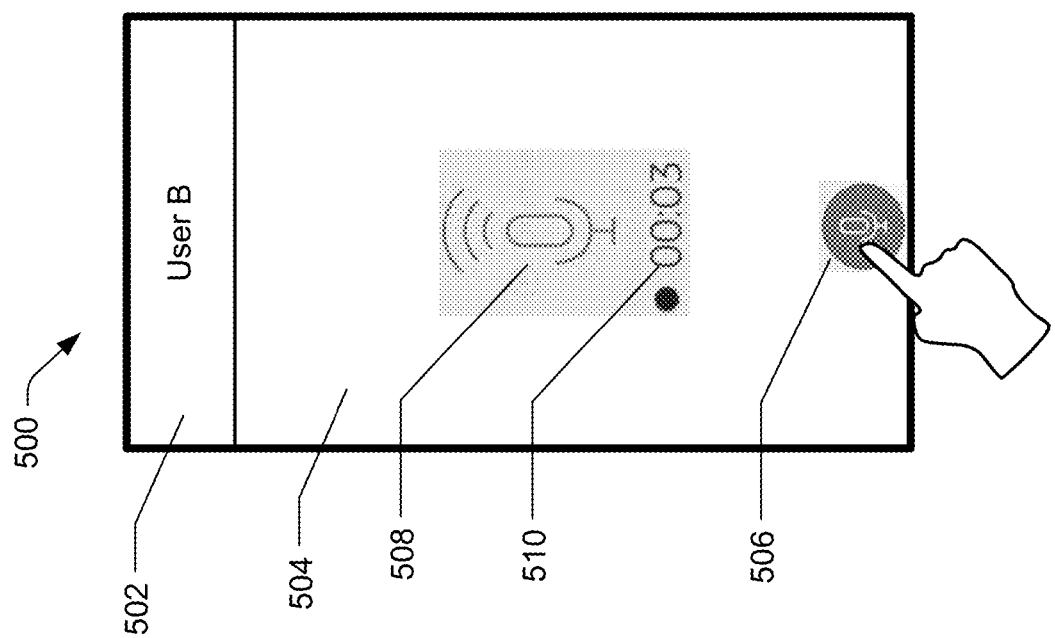
FIG. 5 illustrates an example user interface for recording audio messages.

FIG. 5 illustrates an example user interface 500 for recording audio messages. The user interface 500 may include some or all the features of the user interface 500. For example, the user interface 500 may include a header window 502 and a messaging window 504. The user interface 500 may also include a recording icon 506 that, when selected by the user, may initiate recording of audio by one or more microphones of the first device. Selection of the recording icon 506 may cause the one or more microphones to capture audio from the user and generate audio data corresponding to the captured audio. As shown in FIG. 5, selection of the recording icon 506 may be initiated by a user pressing on the portion of the screen displaying the recording icon 506.

Recording of audio may commence when the user presses the recording icon 506, and recording may continue for as long as the user maintains contact with the portion of the screen associated with the recording icon 506, such as by pressing and holding the portion of the screen associated with the recording icon 506. Alternatively, recording of audio may commence when the user presses and releases the portion of the screen associated with the recording icon 506, and recording may continue until the user presses and release the portion of the screen associated with the recording icon 406 a second time. Alternatively, or additionally, recording of audio may commence when the user provides a command, such as an audible command, to the device to commence recording, and recording may continue until the user provides a command to stop recording. Textual or audio clues may be provided to the user to instruct the user on how to record audio. For example, in the instance where recording of audio commences when the user presses and holds the portion of the screen associated with the recording icon 506, a textual clue such as "Press and hold to record voice message" may be displayed. The textual clue may be provided when the user engages with the user interface 500 in a way that shows an intent to record a message, such as, for example, if the user presses but releases the portion of the screen associated with the recording icon 506.

An indicator 508 may be displayed while the microphone(s) is capturing the audio. The indicator 508 may provide the user with a visual indication that the microphone(s) are capturing audio, signifying to the user that he or she may begin speaking and/or continue speaking. The indicator 508 may be a static image or may be animated. When animated, the indicator 508 may provide the user with an indication of a strength of the audio data being generated by the microphone(s). For example, as shown in FIG. 5, the indicator 508 includes three arched lines above an illustration of a microphone. The arched lines may light up or otherwise change in appearance as the signal strength changes. For example, only the bottom arched line may be lit up when the signal strength is weak, and as the signal strength increases, the middle and upper arched lines may also light up. A timer 510 may also be displayed to provide a visual indication of the duration of the recording.

Figure 6:
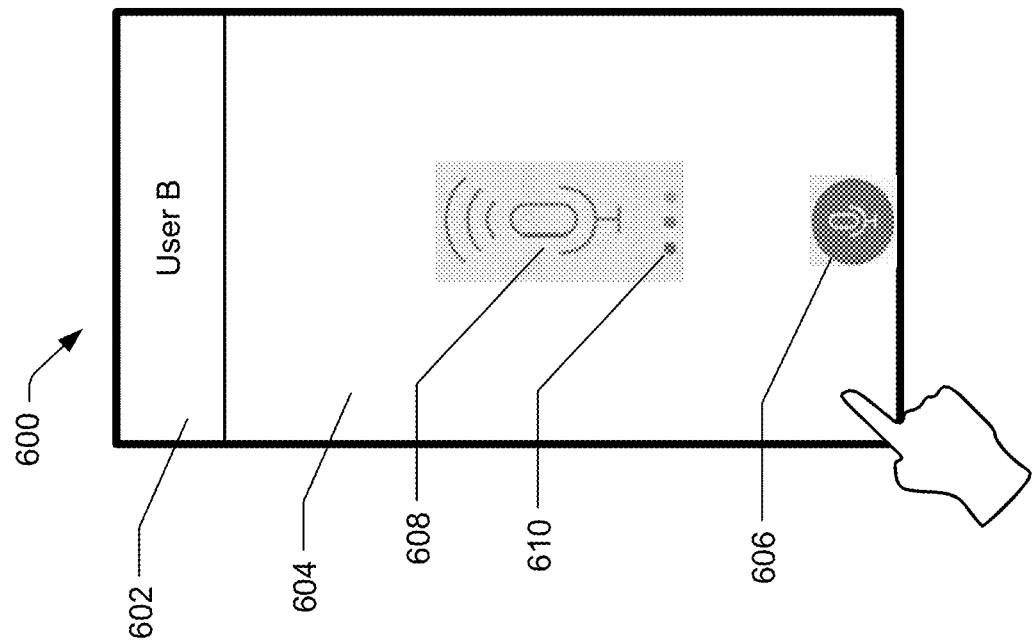
FIG. 6 illustrates an example user interface depicting loading and/or buffering of audio messages.

FIG. 6 illustrates an example user interface 600 depicting loading and/or buffering of audio messages. The user interface 600 may include some or all the features of the user interface 400. For example, the user interface 600 may include a header window 602 and a messaging window 604. The user interface 600 may also include a recording icon 606 that, when selected by the user, initiates capturing of audio by microphone(s) of the first device and generation of audio data corresponding to the audio. Selection by the user may, for example, include the user pressing and holding the portion of the screen associated with the recording icon 606. Selection may also include the user pressing and releasing the portion of the screen associated with the recording icon 606, or the user providing an audible command to the device to initiate recording, for example. An indicator 608 may be displayed to provide a visual indication to the user that audio has been or is being captured by the microphone(s).

A buffering icon 610 may also be displayed to provide a visual indication that audio has been captured and audio data corresponding to the audio is buffering and/or loading. The buffering icon 610 may be displayed when the user stops providing audio to the one or more speakers, and/or when the user releases the portion of the screen associated with the recording icon 606, and/or when the user presses the portion of the screen associated with the recording icon 606 for a second time, and/or when the user provides an audible command to stop recording. In the example depicted in FIG. 6, the user has moved his or her finger off of and/or away from the portion of the screen associated with the recording icon 606 to stop recording of audio.

As shown in FIG. 6, the buffering icon 610 is depicted as an ellipsis. However, the buffering icon 610 may also be depicted as a loading icon, such as a loading bar or loading circle. The loading bar or loading circle may provide the user with an indication of the progress of the buffering and/or loading by, for example, depicting an empty loading bar, such as an unfilled rectangle, or empty loading circle, such as an unfilled circle, and filling or otherwise changing the color or appearance of the loading bar or loading circle as buffering or loading progresses. Additionally, or alternatively, the buffering icon 610 may include a percentage display that may start at 0% and may increase to 100% as the buffering or loading progresses. When buffering or loading is complete, the user interface 600 may stop display of the indicator 608 and the buffering icon 610, and may display components similar to those shown in FIG. 4. Additionally, an icon corresponding to the generated audio data may be displayed along with a transcription corresponding to the audio data.

FIGS. 7A-D illustrate multiple embodiments of an example user interface 700 depicting a process for canceling an audio recording. The user interface 700 may include some or all the features of the user interface 400. For example, the user interface 700 may include a header window 702, a messaging window 704, and a recording icon 706. The user interface 700 may provide the user the ability to cancel a recording while audio is being captured by microphone(s) of the device and/or while the audio data corresponding to the audio is buffering and/or loading. Canceling of the recording may be based at least in part on an indication by the first user. The indication may include, for example, at least one of the indications depicted in FIGS. 7A-D.

For example, in FIG. 7A, the indication may include the user moving his or her finger leftward and/or rightward from the portion of the screen associated with the recording icon 706. As the user moves his or her finger, the recording icon 706 may be "dragged" or "slid" leftward and/or rightward. In this example, the user interface 700 may display a visual indication that the recording is or will be canceled. The visual indication may include text, such as, for example, the word "Canceled." The visual indication may also include a color change on at least a portion of the messaging window 704. The color change may include, for example, a change in color of the recording icon 706 and/or an area near the recording icon 706. For example, as the user moves his or her finger, the recording icon 706 may change color, such as from blue to red, and a horizontal bar proximate to the recording icon 706 may change color, such as from blue to red, as the user moves his or her finger. The horizontal bar may transition from blue to red as the user moves his or her finger such that when the user moves his or her finger a threshold distance, the entire bar is red. The messaging window 704 may also include a reminder that sliding the recording icon 706 leftward or rightward will cancel the recording. The reminder may be text, such as, for example, "Slide to Cancel." When the user moves his or her finger on the touchscreen leftward or rightward, the reminder text may change, such as, for example, to "Release to Cancel." In so doing, the reminder may instruct the user on actions to be taken to indicate an intent to cancel the recording. The user may cancel the cancelation request by, for example, moving his or her finger back toward the recording icon 706.

In another example, as depicted in FIG. 7B, the indication may include moving the user's finger to an area of the messaging window 704 designated for canceling recording. As shown in FIG. 7B, the area designated for canceling recording may be, for example, a trash icon 708. The recording may be canceled when, for example, the user moves his or her finger along the touchscreen to the trash icon 708. Moving the user's finger may cause the recording icon 706 to move from its initial position at or near the bottom of the messaging window 704 to the trash icon 708 or near the trash icon 708. As the user moves his or her finger toward the trash icon 708, the device may display a visual indication that the recording is or will be canceled. The visual indication may include text, such as, for example, the word "Canceled." The visual indication may also include a color change on at least a portion of the messaging window 704. The color change may include, for example, a change in color of the recording icon 706 and/or an area near the recording icon 706. The messaging window 704 may also include a reminder that sliding the recording icon 706 toward the trash icon 708 will cancel the recording. The reminder may be text, such as, for example, "Slide to Trash to Cancel." When the user moves his or her finger to the trash icon 708, the reminder text may change, such as, for example, to "Release to Cancel." In so doing, the reminder may instruct the user on actions to be taken to indicate an intent to cancel the recording. The user may cancel the cancelation request by, for example, moving his or her finger back toward the recording icon 706.

In another example, as depicted in FIG. 7C, the indication may include moving the user's finger upwards. The recording may be canceled when, for example, the user moves his or her finger from its initial position at or near the bottom of the messaging window 704 upward. As the user moves his or her finger upward, display of the recording icon 706 may also move with the user's finger. Doing so may cause the device to display a visual indication that the recording is or will be canceled. The visual indication may include text, such as, for example, the word "Canceled." The visual indication may also include a color change on at least a portion of the messaging window 704. The color change may include, for example, a change in color of the recording icon 706 and/or an area near the recording icon 706. The messaging window 704 may also include a reminder that sliding the recording icon 706 upward will cancel the recording. The reminder may be text, such as, for example, "Slide Upward to Cancel." When the user slides the recording icon 706 upward, the reminder text may change, such as, for example, to "Release to Cancel." In so doing, the reminder may instruct the user on actions to be taken to indicate an intent to cancel the recording. The user may cancel the cancelation request by, for example, moving his or her finger back toward the recording icon 706.

In another example, as depicted in FIG. 7D, the indication may include the user moving a finger away from the recording icon 706. In this example, the user may initially press and hold the portion of the screen associated with the recording icon 706 with a finger to initiate recording of audio. If the user desires to cancel the recording, the user may move his or her finger away from the recording icon 706 and toward any other portion of the user interface 700. The recording may be canceled when, for example, the user moves his or her finger such that no portion of the finger is in contact with the portion of the screen associated with the recording icon 706 or when only a portion of his or her finger is in contact with the portion of the screen associated with the recording icon 706. As the user moves his or her finger away from the recording icon 706, the device may display a visual indication that the recording is or will be canceled. The visual indication may include text, such as, for example, the word "Canceled." The visual indication may also include a color change on at least a portion of the messaging window 704. The color change may include, for example, a change in color of the recording icon 706 and/or an area near the recording icon 706. The messaging window 704 may also include a reminder that moving the user's finger away from the recording icon 706 will cancel the recording. The reminder may be text, such as, for example, "Slide Finger to Cancel." When the user slides his or her finger away from the recording icon 706, the reminder text may change, such as, for example, to "Release to Cancel." In so doing, the reminder may instruct the user on actions to be taken to indicate an intent to cancel the recording. The user may cancel the cancelation request by, for example, moving his or her finger back toward the recording icon 706.

In each of the examples described above with respect to FIGS. 7A-D, movement of the user's finger in the manner described above to cancel the recording may be based at least in part on movement to and/or beyond a threshold boundary around the recording icon 706. For example, the threshold boundary may be to and/or beyond the outer edge of the recording icon 706, to and/or beyond a threshold distance outside of the outer edge of the recording icon 706, and/or to and/or beyond an area designated for recording. Cancelation of the recording may occur upon the user's finger reaching the threshold boundary. Alternatively, cancelation of the recording may not occur until the user's finger reaches the threshold boundary and stops touching the device, such as lifting the finger from the device. In this example, the user may move his or her finger back within the threshold boundary to cancel the cancelation request. The threshold boundary, for example, may be approximately 60% to approximately 80% of half of the screen width of the device.

When the user has provided the indication that the recording should be canceled, an indicator 710 may be displayed to provide the user a visual indication that the indication has been received and the recording has been cancelled. As shown in FIGS. 7A-D, the indicator 710 may be an illustration of a microphone with an "X" adjacent to the microphone. The indicator 710 may also include text, such as the word "Cancelled," to further indicate that the recording has been canceled. When cancellation of a recording is complete, the user interface 700 may return to the message string the user was engaged in, such as shown in FIG. 4.

Figure 8:
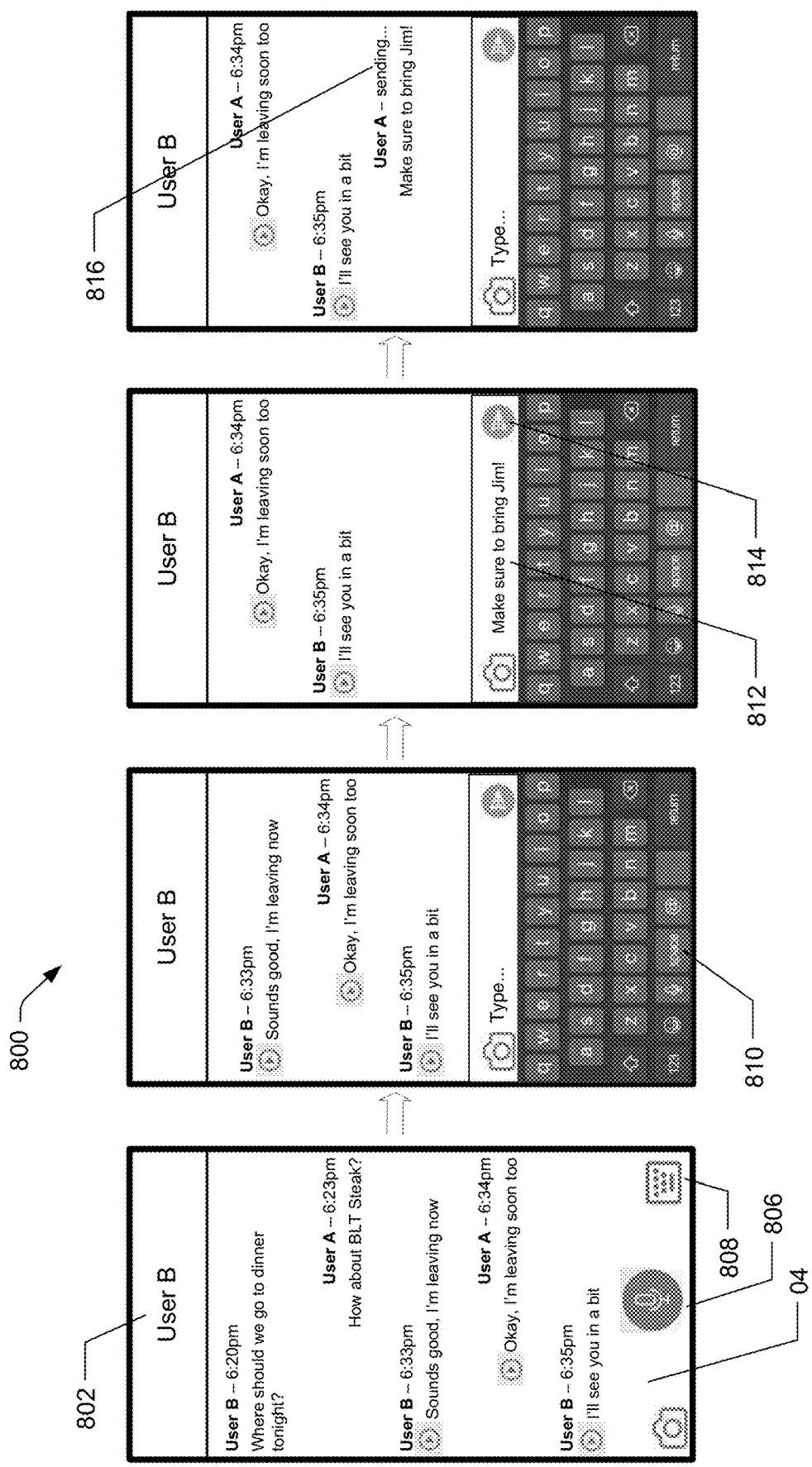
FIG. 8 illustrates an example user interface depicting composition and sending of a text message.

FIG. 8 illustrates an example user interface 800 depicting composition and sending of a text message. The user interface 800 may include some or all the features of the user interface 300. For example, the user interface 800 may include a header window 802, a messaging window 804, and a recording icon 806. The images of the user interface 800 as depicted in FIG. 8 represent a progression, from left to right, of changes to the user interface 800 as the user interacts with the user interface 800.

The user interface 800 may also include a texting icon 808. The texting icon 808 may provide the ability to type a message to be sent to other users, such as, for example, via text messaging. The text message may be sent instead of or in addition to audio messages and corresponding text data representing transcriptions. Selection of the texting icon 808 may cause the first device to display a keyboard 810.

The keyboard 810 may be displayed, for example, at or near the bottom of the messaging window 804. Display of the keyboard 810 may cause messages in the message string to be pushed out of view in the messaging window 804. For example, as shown in FIG. 8, before selection of the texting icon 808, the messaging window 804 included a text message from "User B" received at 6:20 pm and a text message from User A sent at 6:23 pm. Upon selection of the texting icon 808, the keyboard 810 may push these two messages out of view in the messaging window 804 such that the first message in view in the messaging window 804 is an audio message and corresponding transcription received at 6:33 pm from "User B."

A text input window 812 may also be displayed near the keyboard 810. The text input window 812 may provide a visual indication to the user of the message being typed through use of the keyboard 810. As the message is typed by the user, the letters, numbers, and symbols input by the user may be displayed in the text input window 812. The user may initiate typing a message by pressing a key on the keyboard 810 and/or by touching the portion of the screen associated with the text input window 812. As shown in FIG. 8, the user has used the keyboard 810 to type the message "Make sure to bring Jim!," which is displayed in the text input window 812. The text input window 812 may also include a sending icon 814 that, when selected by the user, may cause the message displayed in the text input window 812 to be sent to one or more recipients. A sending indicator 816 may be displayed in the messaging window 804 to indicate that the message is being sent to the one or more recipients. The message may also be displayed in the messaging window 804 near the user's name and/or the sending indicator 816. Additionally, or alternatively, the message may be removed from the text input window 812. Display of the message in the messaging window 804 and/or removal of the message from the text input window 812 may serve as visual indicators to the user that the message is being or has been sent to the one or more recipients. The sending indicator 816 may be removed and a time of day displayed in place of the sending indicator 816 when the message is sent and/or delivered to the one or more recipients' devices. In some instances, sending of the message may cause the keyboard 810 to be removed from display on the user interface 800.

Figure 9:
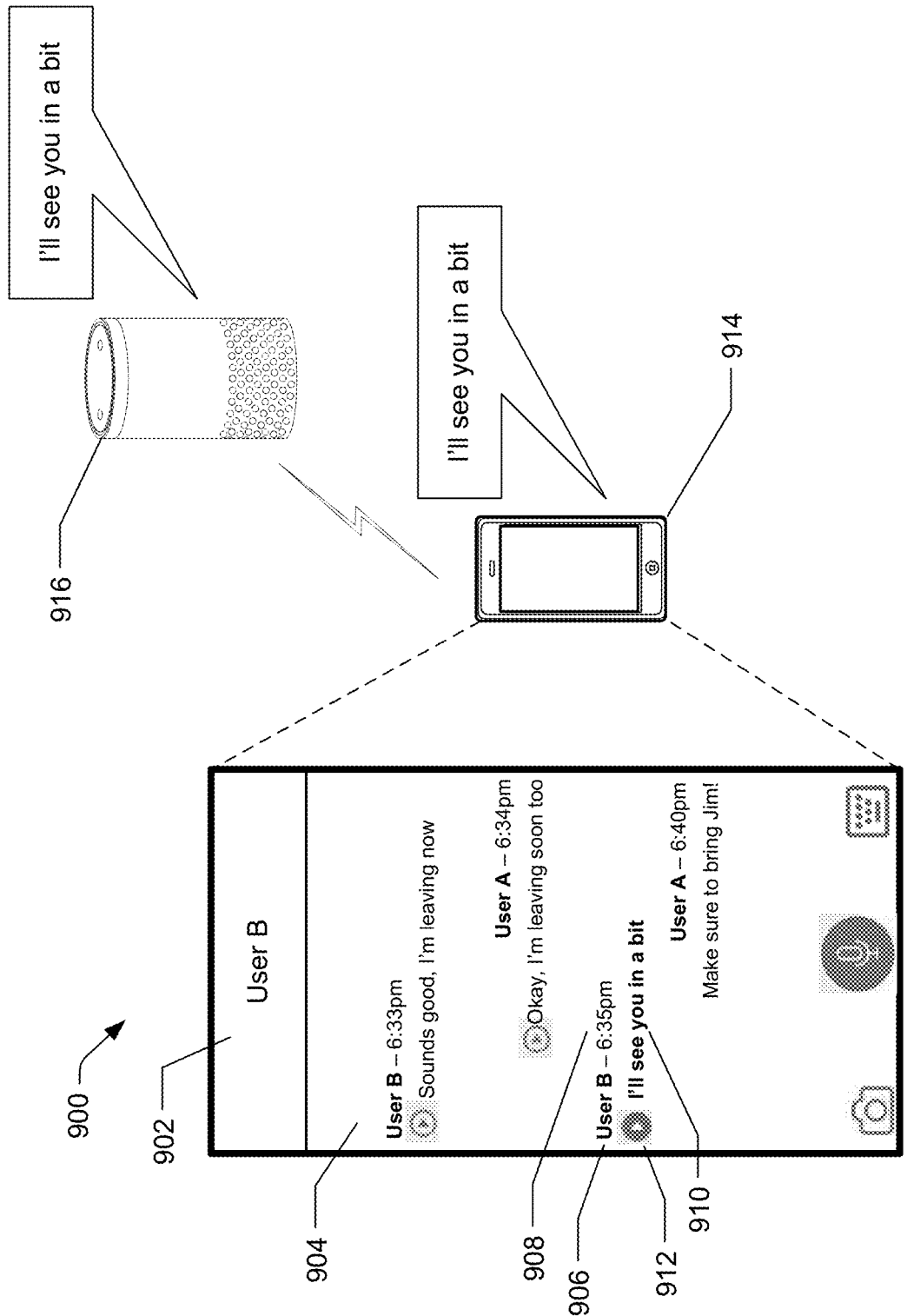
FIG. 9 illustrates an example user interface where a transcription is selected and audio corresponding to the transcription is output by a device.

FIG. 9 illustrates an example user interface 900 depicting selection of a transcription for audio output by the first device. The user interface 900 may include some or all the features of the user interface 400. For example, the user interface 900 may include a header window 902, a messaging window 904, a name 906 of the second user, and a time of day 908 associated in a message sent by the second user. The user interface 900 may also include a transcription 910 presented near an icon 912, which corresponds to audio data received from, for example, a device associated with the second user. The transcription 910 and/or the icon 912 may be selectable by the first user to cause audio associated with the audio data to be output. The audio may be output by one or more speakers of the first device 914 and/or the audio may be output by a third device 916. As shown, for example, in FIG. 9, the first user may select the icon 912. When the icon is selected, it may be displayed differently to visually indicate that the icon 912 has been selected. For example, all or a portion of the icon 912 may change color and/or appear bolded when the icon 912 is selected. Additionally, or alternatively, the transcription 910 may be displayed differently to visually indicate that the audio corresponding to the audio data is being output. For example, all or a portion of the transcription 910 may change color, change font style, change font size, be highlighted, be underlined, be italicized, and/or be bolded.

Figure 10:
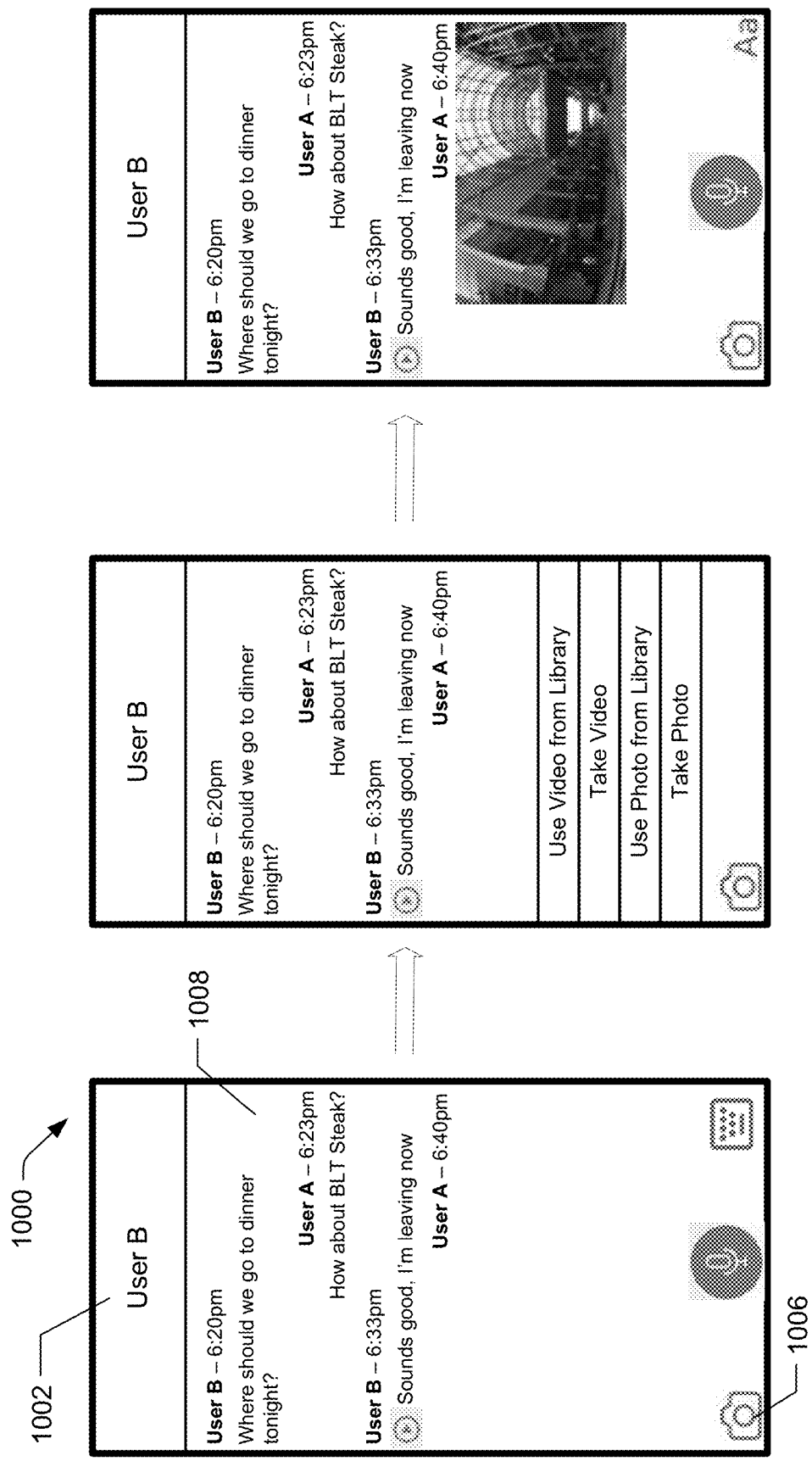
FIG. 10 illustrates an example user interface depicting photo and/or video inclusion in a messaging window.

FIG. 10 illustrates an example user interface 1000 depicting photo and/or video inclusion in a messaging window. The user interface 1000 may include some or all the features of the user interface 400. For example, the user interface 1000 may include a header window 1002 and a messaging window 1004. The images of the user interface 1000 as depicted in FIG. 10 represent a progression, from left to right, of changes to the user interface 1000 as the user interacts with the user interface 1000. The user interface 1000 may also include a photo icon 1006. The photo icon 1006, when selected by the user, may display one or more options for inclusion of a photo or a video into the messaging window 1004. As shown in FIG. 10, selection of the photo icon 1006 may cause display of four, for example, options including (1) "Use Video from Library," (2) "Take Video," (3) "Use Photo from Library," and (4) "Take Photo."

The Use Video from Library option may allow the user to access one or more video libraries stored on the device and/or a remote storage device. The user may select one or more videos from the library, and the selected video(s) may be included, for example loaded, into the messaging window 1004. The Take Video option may allow the user to access video recording functionality of the device. The user may record video, and upon conclusion of the recording, the video may be included, for example loaded, into the messaging window 1004. The Use Photo from Library option may allow the user to access one or more photo libraries stored on the device and/or a remote storage device. The user may select one or more photos from the library, and the selected photo(s) may be included, for example loaded, into the messaging window 1004. The Take Photo option may allow the user to access camera functionality of the device. The user may capture one or more photos with a camera of the device and include, for example load, the photo(s) into the messaging window 1004. As shown in FIG. 10, the user has selected the photo icon 1006, causing the four options described above to be displayed. The user then selects the Use Photo from Library option and chooses a photo from a photo library stored, for example, on the device. The photo is then included in the messaging window 1004.

The user interfaces, such as user interfaces 400-1000, may include additional symbols, text, windows, and features to facilitate messaging between users. The additional features may include display of icons that indicate one or more error states. For example, if a message fails to be sent and/or delivered to a recipient, an indication may be displayed to indicate this failure. The indication may be text that states, for example, "Not delivered." The text may also be presented in a different color from some or all other text in the user interface. The user may be prompted to attempt resending the message and/or the message may be resent automatically periodically until delivered successfully. The indication of message failure may be removed if and/or when the message is successfully sent. Additionally, or alternatively, when a user indicates that one or more messages should be deleted, an error message may be displayed if the message cannot be deleted. The error message may prompt the user to try deleting the message at a later time. Additionally, or alternatively, when a user records an audio message, a transcription may be generated as discussed herein. If, however, an error occurs and the transcription is not available, the user may be presented with an indication of the error, such as, for example, text displayed in place of the transcription. The text may state "Text Not Available," and/or "Voice Message."

The additional features may also include display of icons that indicate one or more loading states. For example, if text data representing a transcription of an audio message has not yet been received or loaded, an icon indicating loading may be presented in place of the text of the transcription. Once the transcription loads, the icon may be removed and the text of the transcription may replace the loading icon. Additionally, or alternatively, when the user selects the transcription or corresponding icon to output audio, loading of the audio message may be necessary before output of the audio can take place. In these instances, the icon may be altered or replaced with a loading icon to indicate to the user that the audio message is being loaded.

Figure 11:
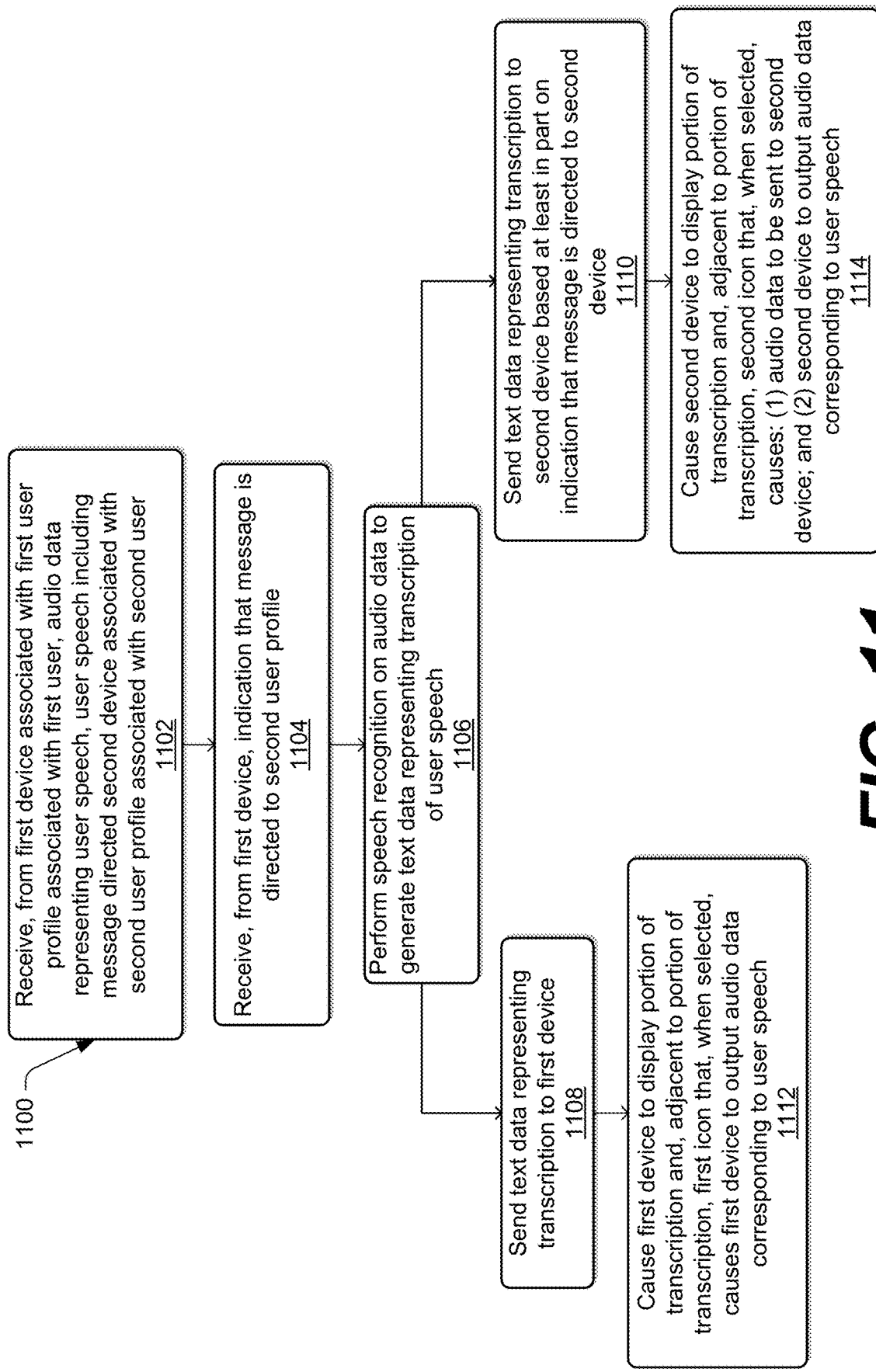
FIG. 11 illustrates a flow diagram of an example process for transcribing audio data and providing the transcription and audio data to one or more user devices.

FIG. 11 illustrates a flow diagram of an example process 1100 for transcribing audio data and providing text data representing the transcription and audio data to one or more user devices associated with one or more users, user profiles, and/or user accounts. Process 1100 is illustrated as a logical flow graph. The order in which the operations or steps are described herein is not intended to be construed as a limitation, and any number of the described operations may be combined in any order and/or in parallel to implement process 1100.

At 1102, the process 1100 may include receiving, from a first device associated with a first user profile associated with a first user, audio data representing user speech. The user speech may include a message directed to a second user profile associated with a second device and/or a second user, for example. The audio data may be generated by at least one microphone associated with the first device. The audio data may include the user speech and other components, such as, for example, background noise. The audio data corresponding to user speech may be received over a network. The network may represent an array of wired networks, wireless networks, such as WiFi, or combinations thereof. The audio data may be received at, for example, a remote system. In some instances, the remote system may be local to an environment associated the first device or the second device. In some instances, some or all of the functionality of the remote system may be performed by one or more of the first device or the second device.

The remote system, the first device, and/or the second device may each include a network interface. These network interfaces may enable communications between the first device, the second device, and the remote system, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

At 1104, the process 1100 may include receiving, from the first device, an indication that the message is directed to the second device. The indication that the message is directed to the second device may be a selection by the first user of a name of the second user and/or contact information associated with the second user. The indication may also correspond to the first user speaking or otherwise entering a command to send the audio data and/or start a conversation with second user. Receiving the indication may be performed over a network and between network interfaces as described herein.

At 1106, the process 1100 may include performing speech recognition on the audio data to generate text data representing a transcription of the user speech. For example, once the audio data is received from the first device, the portion of the audio data corresponding to the user speech may be separated from other components of the audio data, such as, for example, background noise. ASR techniques may be used to determine words making up the user speech. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

At 1108, the process 1100 may include sending the text data representing the transcription to the first device. Sending the text data representing the transcription may be performed over a network and between network interfaces as described herein.

At 1110, the process 1100 may include sending the text data representing the transcription to a second device based at least in part on the indication that the message is directed to the second device. Again, sending the text data representing the transcription may be performed over a network and between network interfaces as described herein.

At 1112, the process 1100 may include causing the first device to display, on a first user interface, the transcription, or a portion thereof. The transcription may be displayed as typed text, for example. The process 1100 may also include causing the first device to display an icon adjacent to the transcription. The icon may correspond to the audio data. The icon, when selected by the first user, may cause one or more speakers to output the audio associated with the audio data.

At 1114, the process 1100 may include causing the second device to display, on a second user interface, the transcription, or a portion thereof. The transcription may be displayed as typed text, for example. The process 1100 may also include causing the second device to display an icon adjacent to the transcription. The icon may correspond to the audio data. The icon, when selected by the second user, may cause the audio data to be sent to the second device. The icon, when selected by the second user, may also, or alternatively, cause one or more speakers of the second device to output the audio associated with the audio data. Additionally, or alternatively, the audio associated with the audio data may be output by a device, such as a third device as depicted in FIG. 1A, connected, via wired or wireless communication, to the second device. The third device may output the audio upon receipt of the audio data by the second device, by selection of the icon by the second user, by selection of the transcription by the second user, and/or by a command provided by the second user, such as, for example, an audible command.

Figure 12:
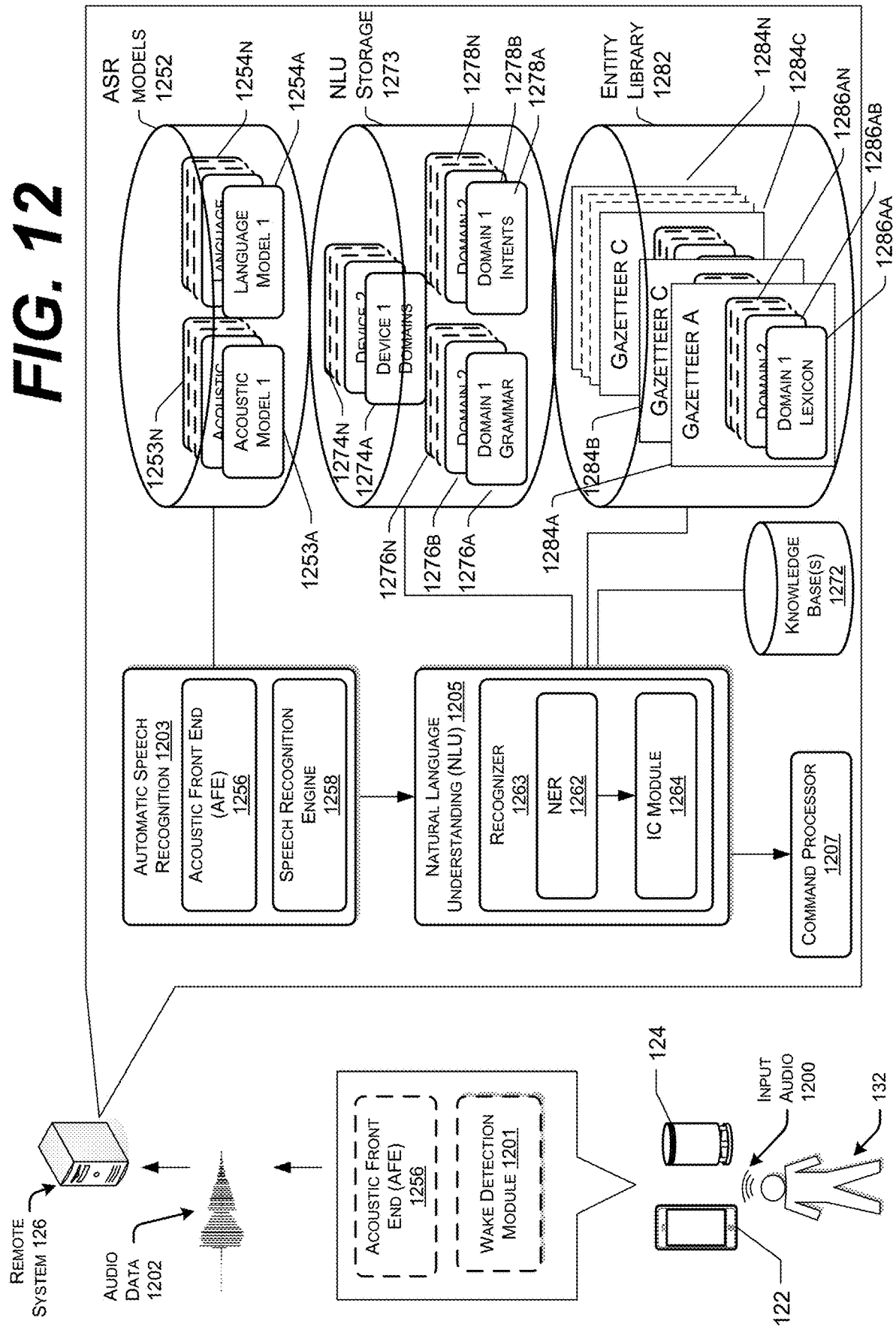
FIG. 12 illustrates a conceptual diagram of components of a speech processing system for processing audio data provided by one or more user devices.

FIG. 12 illustrates a conceptual diagram of how a spoken utterance can be processed, allowing a system to capture and execute commands spoken by a user, such as spoken commands that may follow a wakeword (i.e., a predefined word or phrase for "waking" a device, causing the device to begin sending audio data to a remote system, such as system 126). The various components illustrated may be located on a same or different physical devices. Communication between various components illustrated in FIG. 12 may occur directly or across a network 128. An audio capture component, such as a microphone of the device 122, the device 124, or another device, captures audio 1200 corresponding to a spoken utterance. The device 122 or 124, using a wakeword detection module 1201, then processes audio data corresponding to the audio 1200 to determine if a keyword (such as a wakeword) is detected in the audio data. Following detection of a wakeword, the device sends audio data 1202 corresponding to the utterance, to the remote system 126 that includes an ASR module 1203. The audio data 1202 may be output from an optional acoustic front end (AFE) 1256 located on the device prior to transmission. In other instances, the audio data 1202 may be in a different form for processing by a remote AFE 1256, such as the AFE 1256 located with the ASR module 1203 of the remote system 126.

The wakeword detection module 1201 works in conjunction with other components of the user device, for example a microphone to detect keywords in audio 1200. For example, the device may convert audio 1200 into audio data, and process the audio data with the wakeword detection module 1201 to determine whether speech is detected, and if so, if the audio data comprising speech matches an audio signature and/or model corresponding to a particular keyword.

The user device may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by user device (or separately from speech detection), the user device may use the wakeword detection module 1201 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1201 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 104 may "wake" and begin transmitting audio data 1202 corresponding to input audio 1200 to the remote system 126 for speech processing. Audio data corresponding to that audio may be sent to remote system 126 for routing to a recipient device or may be sent to the remote system 126 for speech processing for interpretation of the included speech (either for purposes of enabling voice-communications and/or for purposes of executing a command in the speech). The audio data 1202 may include data corresponding to the wakeword, or the portion of the audio data corresponding to the wakeword may be removed by the local device 104 prior to sending. Further, a local device may "wake" upon detection of speech/spoken audio above a threshold, as described herein. Upon receipt by the remote system 126, an ASR module 1203 may convert the audio data 1202 into text. The ASR transcribes audio data into text data representing the words of the speech contained in the audio data 1202. The text data may then be used by other components for various purposes, such as executing system commands, inputting data, etc. A spoken utterance in the audio data is input to a processor configured to perform ASR which then interprets the utterance based on the similarity between the utterance and pre-established language models 1254 stored in an ASR model knowledge base (ASR Models Storage 1252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1253 stored in an ASR Models Storage 1252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 1203 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1256 and a speech recognition engine 1258. The acoustic front end (AFE) 1256 transforms the audio data from the microphone into data for processing by the speech recognition engine 1258. The speech recognition engine 1258 compares the speech recognition data with acoustic models 1253, language models 1254, and other data models and information for recognizing the speech conveyed in the audio data. The AFE 1256 may reduce noise in the audio data and divide the digitized audio data into frames representing a time intervals for which the AFE 1256 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1258 may process the output from the AFE 1256 with reference to information stored in speech/model storage (1252). Alternatively, post front-end processed data (such as feature vectors) may be received by the device executing ASR processing from another source besides the internal AFE. For example, the user device may process audio data into feature vectors (for example using an on-device AFE 1256) and transmit that information to a server across a network for ASR processing. Feature vectors may arrive at the remote system 126 encoded, in which case they may be decoded prior to processing by the processor executing the speech recognition engine 1258.

The speech recognition engine 1258 attempts to match received feature vectors to language phonemes and words as known in the stored acoustic models 1253 and language models 1254. The speech recognition engine 1258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1258 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing 1205 (e.g., server 120) may include various components, including potentially dedicated processor(s), memory, storage, etc. As shown in FIG. 12, an NLU component 1205 may include a recognizer 1263 that includes a named entity recognition (NER) module 1262 which is used to identify portions of query text that correspond to a named entity that may be recognizable by the system. A downstream process called named entity resolution actually links a text portion to an actual specific entity known to the system. To perform named entity resolution, the system may utilize gazetteer information (1284a-1284n) stored in entity library storage !282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1203 based on the utterance input audio 1200) and attempts to make a semantic interpretation of the text. That is, the NLU process determines the meaning behind the text based on the individual words and then implements that meaning. NLU processing 1205 interprets a text string to derive an intent or a desired action from the user as well as the pertinent pieces of information in the text that allow a device (e.g., device 104) to complete that action. For example, if a spoken utterance is processed using ASR 1203 and outputs the text "send a message to Joe: Hi Joe, Congratulations . . . " the NLU process may determine that the user intended that the user device capture speech of the user for sending, as an audio file, for output on a device of "Joe".

The NLU may process several textual inputs related to the same utterance. For example, if the ASR 1203 outputs N text segments (as part of an N-best list), the NLU may process all N outputs to obtain NLU results.

As will be discussed further below, the NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command. Further, the NLU process may be used to provide answer data in response to queries, for example using the knowledge base 1272. For instance, the knowledge base 1272 may be used to provide TTS responses via the user device as audio output to the user 132 in response to queries like "what's the weather like today?" In yet another example, a user may state "Play songs by Joe Songbird", resulting in the system identifying a command to "play music", with "songs by Joe Songbird" filling the value of the command to play music on the user's device To correctly perform NLU processing of speech input, an NLU process 1205 may be configured to determine a "domain" of the utterance so as to determine and narrow down which services offered by the endpoint device (e.g., remote system 126 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1262 receives a query in the form of ASR results and attempts to identify relevant grammars and lexical information that may be used to construe meaning. To do so, the NLU module 1205 may begin by identifying potential domains that may relate to the received query. The NLU storage 1273 includes a databases of devices (1274a-1274n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, each domain may be associated with a particular recognizer 1263, language model and/or grammar database (1276a-1276n), a particular set of intents/actions (1278a-1278n), and a particular personalized lexicon (1286). Each gazetteer (1284a-1284n) may include domain-indexed lexical information associated with a particular user and/or device. For example, the Gazetteer A (1284a) includes domain-index lexical information 1286aa to 1286an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 1264 parses the query to determine an intent or intents for each identified domain, where the intent corresponds to the action to be performed that is responsive to the query. Each domain is associated with a database (1278a-1278n) of words linked to intents. For example, a music intent database may link words and phrases such as "quiet," "volume off," and "mute" to a "mute" intent. A voice-message intent database, meanwhile, may link words and phrases such as "send a message", "send a voice message", "send the following", or the like. The IC module 1264 identifies potential intents for each identified domain by comparing words in the query to the words and phrases in the intents database 1278. In some instances, the determination of an intent by the IC module 1264 is performed using a set of rules or templates that are processed against the incoming text to identify a matching intent.

In order to generate a particular interpreted response, the NER 1262 applies the grammar models and lexical information associated with the respective domain to actually recognize a mention one or more entities in the text of the query. In this manner the NER 1262 identifies "slots" (i.e., particular words in query text) that may be needed for later command processing. Depending on the complexity of the NER 1262, it may also label each slot with a type of varying levels of specificity (such as noun, place, city, artist name, song name, or the like). Each grammar model 1276 includes the names of entities (i.e., nouns) commonly found in speech about the particular domain (i.e., generic terms), whereas the lexical information 1286 from the gazetteer 1284 is personalized to the user(s) and/or the device. For instance, a grammar model associated with the shopping domain may include a database of words commonly used when people discuss shopping.

The intents identified by the IC module 1264 are linked to domain-specific grammar frameworks (included in 1276) with "slots" or "fields" to be filled. Each slot/field corresponds to a portion of the query text that the system believes corresponds to an entity. For example, if "play music" is an identified intent, a grammar (1276) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. In another example, if "send a message" is an identified intent, a grammar (1276) framework or frameworks may correspond to sentence structures such as "Send a message to {contact}," "Send a voice message to {contact}," "Send the following to {contact}," etc.

For example, the NER module 1262 may parse the query to identify words as subject, object, verb, preposition, etc., based on grammar rules and/or models, prior to recognizing named entities. The identified verb may be used by the IC module 1264 to identify intent, which is then used by the NER module 1262 to identify frameworks. A framework for an intent of "play" may specify a list of slots/fields applicable to play the identified "object" and any object modifier (e.g., a prepositional phrase), such as {Artist Name}, {Album Name}, {Song name}, etc. A framework for the intent of "send a message", meanwhile, may specify a list of slots/fields applicable to play the identified "contact" and any object modifier (e.g., specifying a device of the recipient) or the like. The NER module 1262 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play Song 1 by the Joe Songbird" might be parsed and tagged as {Verb}: "Play," {Object}: "Song 1," {Object Preposition}: "by," and {Object Modifier}: "Joe Songbird." At this point in the process, "Play" is identified as a verb based on a word database associated with the music domain, which the IC module 1264 will determine corresponds to the "play music" intent. At this stage, no determination has been made as to the meaning of "Song 1" and "Joe Songbird," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 1262 may search the database of generic words associated with the domain (in the knowledge base 1272). So for instance, if the query was "play songs by Joe Songbird," after failing to determine an album name or song name called "songs" by "Joe Songbird," the NER component 1262 may search the domain vocabulary for the word "songs." In the alternative, generic words may be checked before the gazetteer information, or both may be tried, potentially producing two different results.

The results of NLU processing may be tagged to attribute meaning to the query. So, for instance, "play Song 1 by Joe Songbird" might produce a result of: {domain} Music, {intent} Play Music, {artist name} "Joe Songbird," {media type} SONG, and {song title} "Song 1." As another example, "play songs by Joe Songbird" might produce: {domain} Music, {intent} Play Music, {artist name} "Joe Songbird," and {media type} SONG.

The output data from the NLU processing (which may include tagged text, commands, etc.) may then be sent to a command processor 1207. The destination command processor 1207 may be determined based on the NLU output. For example, if the NLU output includes a command to play music, the destination command processor 1207 may be a music playing application, such as one located on the user device or in a music playing appliance, configured to execute a music playing command. If the NLU output includes a search request, the destination command processor 1207 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1205 during runtime operations where NLU operations are performed on text (such as text output from an ASR component 1203). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1263. Each recognizer may include various NLU components such as an NER component 1262, IC module 1264 and other components such as an entity resolver, or other components.

For example, a music domain recognizer 1263-A (Domain A) may have an NER component 1262-A that identifies what slots (i.e., portions of input text) may correspond to particular words relevant to that domain. The words may correspond to entities such as (for the music domain) a performer, album name, song name, etc. An NER component 1262 may use a machine learning model, such as a domain specific conditional random field (CRF) to both identify the portions corresponding to an entity as well as identify what type of entity corresponds to the text portion. For example, for the text "play songs by Joe Songbird," an NER 1262-A trained for a music domain may recognize the portion of text [Joe Songbird] corresponds to an entity and an artist name. The music domain recognizer 1263-A may also have its own intent classification (IC) component 1264-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 126 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 126, as illustrated herein are exemplary, and may be located in a stand-alone device or may be included, in whole or in part, as a component of a larger device or system, may be distributed across a network or multiple devices connected by a network, etc.

Figure 13:
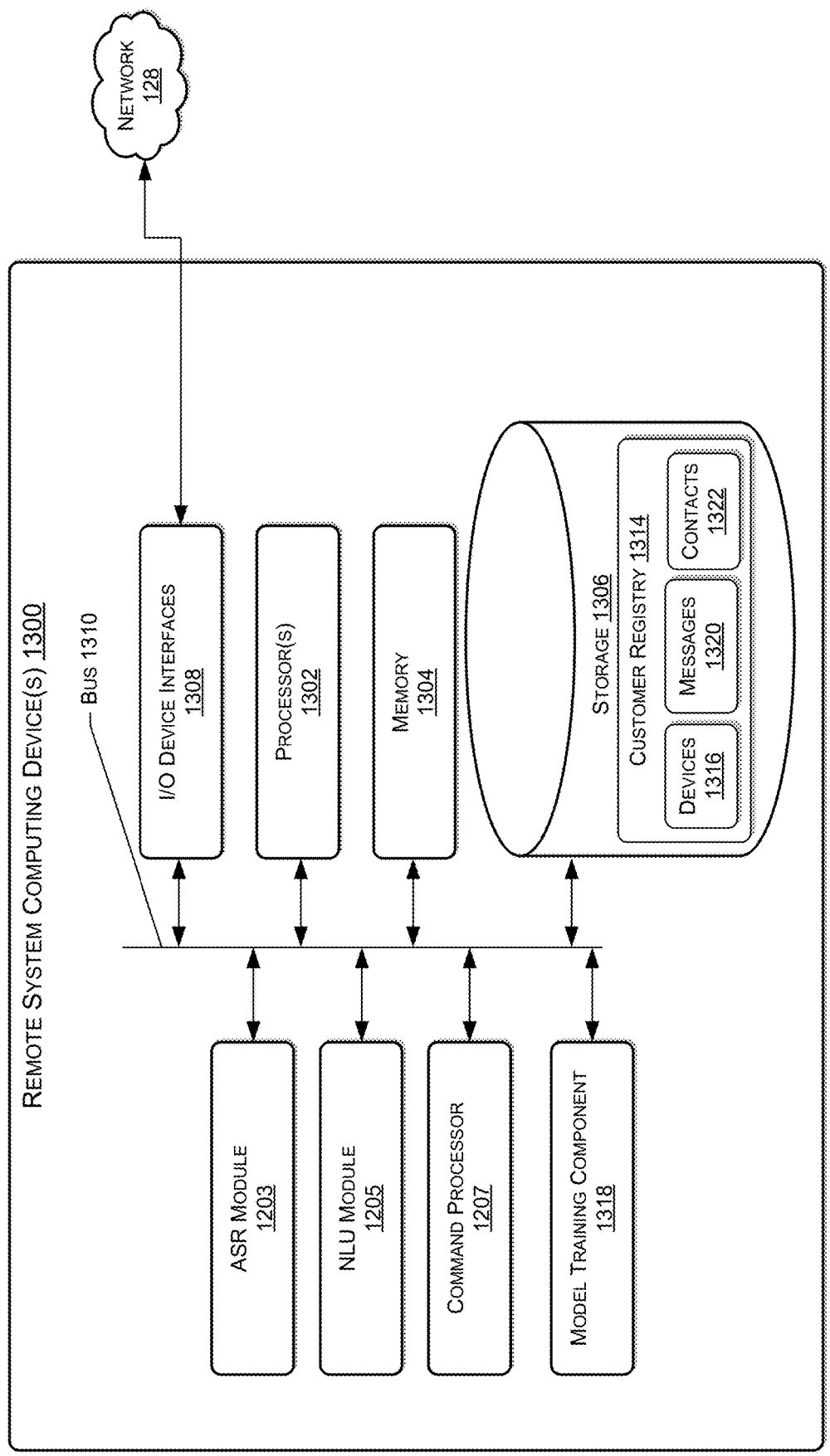
FIG. 13 illustrates a functional block diagram of computer components implemented at a computing device(s) of a remote system according to embodiments described herein.

FIG. 13 illustrates example components of one or more computing devices 1300 of the remote system 126. As illustrated, the devices 1300 may include one or more processors 1302, memory 1304 for storing executable instructions, and storage 1306 for storing an array of information. For instance, the storage 1306 may store a customer registry 1314 that maintains associations between devices 1316 and respective customer accounts, as well as the audio files 1320 associated with the messages described herein. These messages may be associated with the IDs described above, such as communication IDs, audio-content IDs, mailbox/user IDs, and/or the like. In addition, the storage 1306 may store a contacts list 1322 that associates respective users with one or more devices. For instance, "Joe", referenced above, may be associated with one or more addresses or identifiers of one or more devices (e.g., an IP address of a voice-controlled device, a MAC address of a laptop computer, a phone number of a mobile phone, or combinations thereof).

In addition, the devices 1300 may include the ASR module 1203, the NLU module 1205, and command processor 1207 described above. These components may execute on the processors 1302 for allowing users, such as the example users of FIGS. 1A-B, to provide voice commands to the remote system 126 and cause performance of one or more actions in response. That is, the users may provide audio input to respective user devices, which may send respective audio files over the network(s) 128 to the device(s) 1300. The devices 1300 may then perform speech processing on these audio files, as discussed in detail with reference to FIG. 12, before providing one or more instructions and/or audio or other types of files for output by the user devices. For instance, the devices 1300 may provide, over the network(s) 128, instructions to the user devices along with audio files for outputting on speakers of the user devices, text or other visual content for outputting on displays of the user devices, or the like. In some instances, a first set of computing devices 1300 interacts with the user devices, such as by receiving audio files from the user devices before providing these files to the a second set of computing devices 1300 of the remote system 126. The second set of computing devices may then perform the ASR/NLU techniques on the audio files as described above and may provide, to the first set of computing devices, information such as text of the audio files, commands/domains/intents of the audio files, or the like. The first set of computing devices may then store the audio files and/or the received information, such as the text, etc., and may provide the audio files to the recipient user devices.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving a first communication comprising:
      audio data representing user speech;
      a first identifier (ID) of the audio data; and
      a second ID of the first communication;
   storing first data indicating that the audio data has been stored in association with the first ID;
   receiving a second communication comprising the first ID of the audio data, the second communication having a third ID of the second communication;
   determining, based at least in part on the first data, that the audio data is already stored in association with at least one prior communication, the at least one prior communication including the first communication;
   determining to reduce memory usage associated with storing communication-related data by refraining from storing another instance of the audio data associated with the second communication based at least in part on determining that the first data is already stored in association with the at least one prior communication;
   storing, based at least in part on determining that the first data is already stored, second data indicating that the third ID is associated with the first ID; and
   storing third data representing a resource locator for the audio data such that the audio data is configured to be retrieved in association with the first ID and the third ID utilizing the resource locator.

2. The method of claim 1, wherein the determining that the first data is stored comprises reading data to identify the first data.

3. The method of claim 1, wherein:
   the receiving the first communication comprises receiving the first communication by a communications application executing on a device; and
   the storing the first data comprises storing the first data in a Least Recently Used (LRU) cache.

4. The method of claim 1, further comprising:
   receiving request data for output of audio corresponding to the audio data;
   identifying, based at least in part on the request data, the third ID of the second communication;
   determining that the third ID of the second communication is associated with the first ID of the audio data; and
   outputting, on a speaker of a device, the audio.

5. The method of claim 1, wherein the audio data comprises first audio data, and the method further comprises:
   receiving a third communication comprising second audio data representing second user speech, a fourth ID of the second audio data, and a fifth ID of the third communication;
   determining that the fourth ID is different than each respective ID that is stored;
   storing the second audio data in association with the fourth ID; and
   storing third data indicating that the fifth ID is associated with the fourth ID.

6. A method comprising:
   receiving a first communication comprising first identifier (ID) data of content data associated with the first communication and second ID data of the first communication;
   storing first data indicating that the content data is associated with the first ID data;
   receiving a second communication comprising the first ID data of the content data and third ID data of the second communication;
   determining that the content data is already stored in association with at least one prior communication, the at least one prior communication including the first communication;
   determining to reduce memory usage associated with storing communication-related data by refraining from again storing the content data based at least in part on determining that the content data is already stored in association with the at least one prior communication;
   storing, based at least in part on determining that the first ID data is associated with the content data as currently stored, second data indicating that the third ID data is associated with the first ID data; and
   storing third data representing a resource locator for the audio data such that the audio data is configured to be retrieved in association with the first ID and the third ID utilizing the resource locator.

7. The method as recited in claim 6, wherein the determining that the content data is currently stored comprises at least one of:

identifying the first ID data associated with the content data; or identifying the first data indicating that the second ID data is associated with the first ID data.

8. The method as recited in claim 6, wherein:

the receiving the first communication comprises receiving the first communication at a communal mailbox associated with a device; and the receiving the second communication comprises receiving the second communication at an individual mailbox associated with the device.

9. The method as recited in claim 6, wherein the storing the first data comprises storing the first data in a Least Recently Used (LRU) cache configured to delete content data stored in the LRU cache according to recency of access of the respective content data, wherein least-recently-accessed content data is deleted first.

10. The method as recited in claim 6, wherein the content data comprises first content data, and the method further comprises:

receiving a third communication comprising fourth ID data of second content data associated with the third communication and fifth ID data of the third communication;

determining that the fourth ID data is different than each respective ID data associated with content data that is stored;

storing, the second content data in association with the fourth ID; and storing third data indicating that the fifth ID data is associated with the fourth ID data.

11. The method as recited in claim 6, wherein the first communication comprises first text data, and the method further comprises presenting, on a display associated with a device, first text corresponding to the first text data and a first icon that, when selected, causes a speaker of the device to output audio corresponding to the content data.

12. The method as recited in claim 6, further comprising:

generating audio data based at least in part on sound captured by a microphone;

determining that the audio data comprises a request to output audio corresponding to the content data; and outputting the audio on a speaker.

13. The method as recited in claim 6, wherein the first communication comprises first text data, the content data comprises image data, and the method further comprises presenting, on a display, first text corresponding to the first text data and a first icon that, when selected, causes a device to present images corresponding to the image data on the display.

14. A computing device comprising:

one or more processors;

memory; and computer-executable instructions stored in the memory and, when executed on the one or more processors, cause the one or more processors to perform acts comprising:

receiving a first communication comprising first identifier (ID) data of content data associated with the first communication and second ID data of the first communication;

storing, in the memory, first data indicating that the second ID data is associated with the first ID data;

receiving a second communication comprising the first ID data of the content data and third ID data of the second communication;

determining that the content data is already stored in association with at least one prior communication, the at least one prior communication including the first communication;

determining to reduce memory usage associated with storing communication-related data by refraining from again storing the content data based at least in part on determining that the content data is already stored in association with the at least one prior communication;

storing, in the memory and based at least in part on determining that the content data is already stored in the memory, second data indicating that the third ID data is associated with the first ID data; and storing, in the memory, third data representing a link for the audio data such that the audio data is configured to be retrieved in association with the first ID and the third ID utilizing the link.

15. The computing device of claim 14, the acts further comprising:

receiving, at a time, a request to access the content data stored in the memory;

outputting content corresponding to the content data on the device; and storing, in association with the content data in the memory, metadata indicating a last time of access of the content data, the last time of access based at least in part on the time.

16. The computing device of claim 14, wherein the content data comprises first content data, and the acts further comprise:

receiving a third communication at the device, the third communication comprising fourth ID data of second content data associated with the third communication and fifth ID data of the third communication;

determining that the fourth ID data is different than each respective ID data associated with content data stored in the memory;

storing, in the memory, the second content data in association with the fourth ID data; and storing, in the memory, third data indication that the fifth ID data is associated with the fourth ID data.

17. The computing device of claim 14, wherein the computing device comprises a first computing device, the content data comprises audio data, the first communication comprises first text data, and the acts further comprise presenting, on a display of the first device or a second device, first text corresponding to the first text data and a first icon that, when selected, causes a speaker of the first device or the second device to output audio corresponding to the audio data.

18. The computing device of claim 14, further comprising:

a microphone;

a speaker;

wherein the content data comprises audio data; and the acts further comprise:

generating second audio data based at least in part on sound captured by the microphone;

sending the second audio data to a server computing device;

receiving, from the server computing device, data causing output of audio corresponding to the first audio data; and outputting the audio on the speaker.

19. The computing device of claim 14, wherein the computing device comprises a first computing device, the content data comprises image data, the first communication comprises text data, and the acts further comprise presenting, on a display of the first computing device or a second computing device, text corresponding to the text data and a first icon that, when selected, causes the first computing device or the second computing device to present images corresponding to the image data on the display.

20. The method of claim 6, further comprising:
determining that the first communication is associated with a communal mailbox associated with a voice-controlled device, the communal mailbox configured to allow access, via a voice user interface, to the content data by multiple user profiles associated with the voice-controlled device;
determining that the second communication is associated with a user profile of the multiple user profiles; and
wherein determining to reduce memory usage is further based on the user profile being one of the multiple user profiles associated with the voice-controlled device.

\* \* \* \* \*